United States Patent
Bega et al.

(10) Patent No.: US 12,349,000 B2
(45) Date of Patent: Jul. 1, 2025

(54) MECHANISM FOR ENABLING CUSTOM ANALYTICS

(71) Applicant: NOKIA TECHNOLOGIES OY, Espoo (FI)

(72) Inventors: Dario Bega, Munich (DE); Bahare Masood Khorsandi, Munich (DE); Gerald Kunzmann, Munich (DE); Yannick Lair, Voisins le Bretonneux (FR); Apostolos Papageorgiou, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/932,028

(22) Filed: Sep. 14, 2022

(65) Prior Publication Data
US 2023/0079052 A1   Mar. 16, 2023

Related U.S. Application Data

(60) Provisional application No. 63/244,354, filed on Sep. 15, 2021.

(51) Int. Cl.
*H04L 41/14* (2022.01)
*H04W 24/08* (2009.01)
*H04W 24/10* (2009.01)

(52) U.S. Cl.
CPC ............ *H04W 24/10* (2013.01); *H04L 41/14* (2013.01); *H04W 24/08* (2013.01)

(58) Field of Classification Search
CPC ..... H04W 24/10; H04W 24/08; H04W 24/02; H04W 24/04; H04L 43/06; H04L 41/14
See application file for complete search history.

(56) References Cited

U.S. PATENT DOCUMENTS

2019/0354865 A1* 11/2019 Reisser ................. G06N 3/082
2021/0273856 A1*  9/2021 Marquezan ........... H04L 9/3297
(Continued)

FOREIGN PATENT DOCUMENTS

WO   WO-2022067838 A1 *  4/2022   ......... H04L 41/0806

OTHER PUBLICATIONS

"3rd Generation Partnership Project; Technical Specification Group Services and System Aspects; Architecture enhancements for 5G System (5GS) to support network data analytics services (Release 17)", 3GPP TS 23.288 v17.1.0, (Jun. 2021), 192 pages.
(Continued)

*Primary Examiner* — Tom Y Chang
(74) *Attorney, Agent, or Firm* — ALSTON & BIRD LLP

(57) ABSTRACT

An apparatus for use by a communication network element or communication network function configured to operate as an analytics entity and having an analytics logical function. The apparatus is caused to: receive a request, from a service consumer, for provision of a custom analytics service, process data retrieved from the request for determining whether a model for providing the requested custom analytics service is prepared, and in case the determination is negative, determine and select a model training entity having a model training logical function which is able to create a model for custom analytics and has access to data required for the requested custom analytics service, request, from the selected model training entity, to obtain a trained model capable of providing the requested custom analytics service and forward the information specifying the custom analytics service to the selected model training entity.

22 Claims, 11 Drawing Sheets

(56) References Cited

U.S. PATENT DOCUMENTS

| | | | |
|---|---|---|---|
| 2021/0297874 A1* | 9/2021 | Marquezan | G06F 16/90335 |
| 2021/0297876 A1* | 9/2021 | Bellamkonda | G06N 20/00 |
| 2021/0329479 A1* | 10/2021 | Al-Dulaimi | H04L 41/147 |
| 2021/0351993 A1* | 11/2021 | Puente Pestaña | H04L 41/046 |
| 2022/0108214 A1* | 4/2022 | Lee | H04W 8/00 |
| 2022/0294606 A1* | 9/2022 | Norrman | G06N 20/00 |
| 2023/0164598 A1* | 5/2023 | Yao | H04W 24/04 370/252 |

OTHER PUBLICATIONS

"3rd Generation Partnership Project; Technical Specification Group Services and System Aspects; Management and orchestration; Management Data Analytics (MDA) (Release 17)", 3GPP TS 28.104 v0.0.0, (Apr. 2021), 7 pages.

"3rd Generation Partnership Project; Technical Specification Group Services and System Aspects; Management and orchestration; Study on enhancement of Management Data Analytics (MDA) (Release 17)", 3GPP TR 28.809 v17.0.0, (Mar. 2021), 15 pages.

"3rd Generation Partnership Project; Technical Specification Group Services and System Aspects; Procedures for the 5G System (5GS); Stage 2 (Release 17)", 3GPP TS 23.502 v17.1.0, (Jun. 2021), 692 pages.

"3rd Generation Partnership Project; Technical Specification Group Services and System Aspects; System architecture for the 5G System (5GS); Stage 2 (Release 17)", 3GPP TS 23.501 v17.1.1, (Jun. 2021), 526 pages.

* cited by examiner

MECHANISM FOR ENABLING CUSTOM ANALYTICS

CROSS-REFERENCE TO RELATED APPLICATIONS

This application claims the benefit of U.S. Provisional Application No. 63/244,354, filed Sep. 15, 2021, the entire contents of which are incorporated herein by reference.

DESCRIPTION

BACKGROUND

Field

Examples of embodiments relate to apparatuses, methods, systems, computer programs, computer program products and (non-transitory) computer-readable media usable for improving network analytics by enabling custom analytics. Specifically, examples of embodiments relate to apparatuses, methods, systems, computer programs, computer program products and (non-transitory) computer-readable media usable for enabling to provide, to a service consumer, custom analytics.

Background Art

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

The following meanings for the abbreviations used in this specification apply:
  3GPP 3$^{rd}$ Generation Partnership Project
  4G fourth generation
  5G fifth generation
  5GS 5G system
  ADRF analytic data repository function
  AF application function
  AI artificial intelligence
  AMF access and mobility function
  AnLF analytics logic function
  CPU central processing unit
  DCCF data collection coordination function
  eNB E-UTRAN Node B
  gNB next generation node B
  ID identification
  IP Internet protocol
  LTE Long Term Evolution
  LTE-A LTE Advanced
  MDAS management data analytics service
  ML machine learning
  MDAS management data analytics service
  MTLF model training logical function
  NF network function
  NRF network repository function
  NW network, network side
  NWDAF network data analytics function
  OAM operation administration and maintenance
  SMF session management function
  UE user equipment

SUMMARY

According to an example of an embodiment, there is provided, for example, an apparatus for use by a communication network element or communication network function configured to operate as an analytics entity and having an analytics logical function, the apparatus comprising at least one processing circuitry, and at least one memory for storing instructions to be executed by the processing circuitry, wherein the at least one memory and the instructions are configured to, with the at least one processing circuitry, cause the apparatus at least: receive a request, from a service consumer, for provision of a custom analytics service, the request comprising information specifying the custom analytics service, to process data retrieved from the request for determining whether a model for providing the requested custom analytics service is prepared, and in case the determination is negative, to determine and select a model training entity having a model training logical function which is able to create a model for custom analytics and has access to data required for the requested custom analytics service, to request, from the selected model training entity, to obtain a trained model capable of providing the requested custom analytics service and to forward the information specifying the custom analytics service to the selected model training entity.

Furthermore, according to an example of an embodiment, there is provided, for example, a method for use in a communication network element or communication network function configured to operate as an analytics entity and having an analytics logical function, the method comprising receiving a request, from a service consumer, for provision of a custom analytics service, the request comprising information specifying the custom analytics service, processing data retrieved from the request for determining whether a model for providing the requested custom analytics service is prepared, and in case the determination is negative, determining and selecting a model training entity having a model training logical function which is able to create a model for custom analytics and has access to data required for the requested custom analytics service, requesting, from the selected model training entity, to obtain a trained model capable of providing the requested custom analytics service and forwarding the information specifying the custom analytics service to the selected model training entity.

According to further refinements, these examples may include one or more of the following features:
  the information specifying the custom analytics service may comprise at least one of: an indication element for indicating that a custom analytics service is requested, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service;
  a trained model may be received from the selected model training entity, data required for the custom analytics service may be collected, the trained model may be run using the collected data, and a custom analytics report representing a result of running the trained model may be provided to the service consumer, the report including output information as specified in the information included in the request from the service consumer;

when the determination whether a model for providing the requested custom analytics service is prepared is affirmative, data required for the custom analytics service may be collected, the prepared model may be run using the collected data, and a custom analytics report representing a result of running the prepared model may be provided to the service consumer, the report including output information as specified in the information included in the request from the service consumer;

profile information specifying the network data analytics entity having the analytics logical function in a network repository element or a network repository function may be registered or updated, wherein the profile information may comprise a list of available or collectable data and information indicating the ability to provide custom analytics services.

According to an example of an embodiment, there is provided, for example, an apparatus for use by a communication network element or communication network function configured to operate as a model training entity having a model training logical function, the apparatus comprising at least one processing circuitry, and at least one memory for storing instructions to be executed by the processing circuitry, wherein the at least one memory and the instructions are configured to, with the at least one processing circuitry, cause the apparatus at least: to receive, from an analytic entity, a request to obtain a trained model capable of providing a custom analytics service, the request comprising information specifying the custom analytics service, to obtain, from data sources, information required to train a model for providing the requested custom analytics service, to determine a model being able to process the obtained information, to prepare data according to the information specifying the custom analytics service, to train the model using the prepared data, and to provide the trained model to the analytic entity.

Furthermore, according to an example of an embodiment, there is provided, for example, a method for use in a communication network element or communication network function configured to operate as a model training entity having a model training logical function, the method comprising receiving, from an analytic entity, a request to obtain a trained model capable of providing a custom analytics service, the request comprising information specifying the custom analytics service, obtaining, from data sources, information required to train a model for providing the requested custom analytics service, determining a model being able to process the obtained information, preparing data according to the information specifying the custom analytics service, training the model using the prepared data, and providing the trained model to the analytic entity.

According to further refinements, these examples may include one or more of the following features:

the information specifying the custom analytics service may comprise at least one of: an indication element for indicating that a custom analytics service is requested, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service;

the data sources may comprise at least one of a communication network element or communication network function, and an analytic data repository entity;

profile information specifying the model training entity having the model training logical function may be registered or updated in a network repository element or a network repository function, wherein the profile information may comprise a list of available or collectable data and information indicating the ability to provide trained models for custom analytics services;

it may be determined whether the trained model is allowed to be exposed to other service consumers, in case the determination is negative, profile information may be updated in a network repository element or a network repository function, wherein the profile information may comprise a specification of the custom analytics service including a description of analytics and meta data, and an identification of the service consumer for which the custom analytics service is provided, and the analytic entity to which the trained model is sent may be informed that the custom analytics service is to be provided only to specific consumers;

in case the determination is affirmative, profile information may be updated in a network repository element or a network repository function, wherein the profile information may comprise a specification of the custom analytics service including a description of analytics and meta data, without limiting the usage of the custom analytics service to specified consumers.

According to an example of an embodiment, there is provided, for example, an apparatus for use by a communication network element or communication network function configured to operate as a network repository entity, the apparatus comprising at least one processing circuitry, and at least one memory for storing instructions to be executed by the processing circuitry, wherein the at least one memory and the instructions are configured to, with the at least one processing circuitry, cause the apparatus at least: to receive a discovery request, from a service consumer, indicating that a custom analytics service is requested, the request comprising information specifying at least one of input data and input data sources required for setting up the requested custom analytics service, to process the information comprised in the request, to return, to the service consumer, a list of network functions supporting custom analytics services and having access to required information for the requested custom analytics service.

Furthermore, according to an example of an embodiment, there is provided, for example, a method for use in a communication network element or communication network function configured to operate as a network repository entity, the method comprising receiving a discovery request, from a service consumer, indicating that a custom analytics service is requested, the request comprising information specifying at least one of input data and input data sources required for setting up the requested custom analytics service, processing the information comprised in the request, returning, to the service consumer, a list of network functions supporting custom analytics services and having access to required information for the requested custom analytics service.

According to further refinements, these examples may include one or more of the following features:

it may be checked whether the service consumer is allowed to access to custom analytics service or to required information for the requested custom analytics service, wherein the list of network function may be returned only in case the check is affirmative;

the list of network functions may further include an indication of collectable data per network function instance and a list of available custom analytics;

a registration or update of profile information specifying a network entity having at least one of an analytics logical function and a model training logical function may be received, wherein the profile information may comprise a list of available or collectable data and information indicating the ability to provide custom analytics services or information indicating the ability to provide trained models for custom analytics services.

According to an example of an embodiment, there is provided, for example, an apparatus for use by a communication network element or communication network function configured to operate as a service consumer, the apparatus comprising at least one processing circuitry, and at least one memory for storing instructions to be executed by the processing circuitry, wherein the at least one memory and the instructions are configured to, with the at least one processing circuitry, cause the apparatus at least: to send, to a network repository entity, a discovery request indicating that a custom analytics service is requested, the request comprising information specifying at least one of input data and input data sources required for setting up the requested custom analytics service, to receive, from the network repository entity, a list of network functions supporting custom analytics services and having access to required information for the requested custom analytics service, to check whether the received list comprises a custom analytics service satisfying the requirements of the requested custom analytics service and to contact a network function according to a result of the check.

Furthermore, according to an example of an embodiment, there is provided, for example, a method for use in a communication network element or communication network function configured to operate as a service consumer, the method comprising sending, to a network repository entity, a discovery request indicating that a custom analytics service is requested, the request comprising information specifying at least one of input data and input data sources required for setting up the requested custom analytics service, receiving, from the network repository entity, a list of network functions supporting custom analytics services and having access to required information for the requested custom analytics service, checking whether the received list comprises a custom analytics service satisfying the requirements of the requested custom analytics service and contacting a network function according to a result of the check.

According to further refinements, these examples may include one or more of the following features:

the list of network functions may further include an indication of collectable data per network function instance and a list of available custom analytics;

in case the check results that the received list comprises a custom analytics service satisfying the requirements of the requested custom analytics service, a network function providing the identified custom analytics service may be contacted and information specifying the custom analytics service may be sent;

the information specifying the custom analytics service may comprise at least one of: an indication element for indicating the identified custom analytics service, information about input data related to the custom analytics service, information indicating output data expected from the custom analytics service, information indicating a type of analytic of the custom analytics service, information indicating a time period for the custom analytics service, information indicating a reporting interval for the custom analytics service information indicating how to label data of the custom analytics service, and information indicating that spatial trends are to be captured by the custom analytics service;

in case the check results that the received list does not comprise a custom analytics service satisfying the requirements of the requested custom analytics service, a network function configured to operate as an analytics entity having an analytics logical function and input data from available or collectable data of the selected network function for building the requested custom analytics service may be selected from the received list, the selected network function may be contacted and a request for provision of a custom analytics service may be sent, the request comprising information specifying the custom analytics service; in this case, the information specifying the custom analytics service may comprise at least one of: an indication element for indicating that a custom analytics service is requested, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service;

a custom analytics report may be received from the contacted network function, the report including output information as specified in the information included in the request to the network function.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present disclosure are described below, by way of example only, with reference to the accompanying drawings, in which.

DESCRIPTION OF EMBODIMENTS

Figure 1:
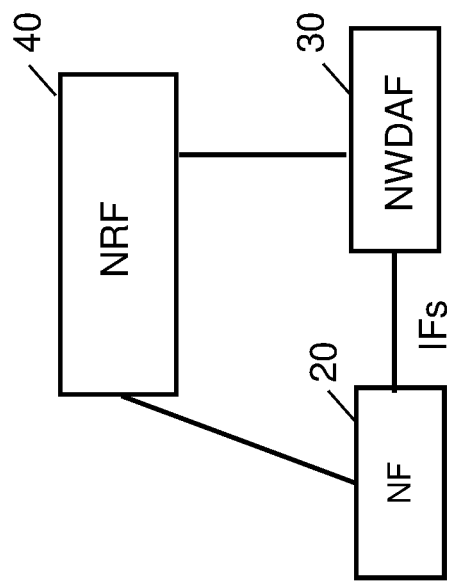
FIG. 1 shows a diagram illustrating an example of a network architecture in which examples of embodiments are implementable.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

In order to improve performance, reliability, visibility, or security of a communication network, network analytics is used which is a process where network data are collected and analyzed. In network analytics, for example, a software engine analyzes and extracts intelligence from data collected from various sources, such as network devices (switches, routers, wireless), servers, database, etc., and traffic-flow details (wireless congestion, data speeds, latency, etc.).

Network analytics processes are usually automated and can scale to many devices, clients, users, and applications, while improving overall user experience and not substantially increasing operating costs.

The intelligence required for network analytics can be used for several tasks, such as spotting bottlenecks, issue remediation, identifying connected endpoints, and probing for potential security lapses. For example, for improving operations, network analytics can compare incoming data with preprogrammed models and makes appropriate decisions. The data is fed into a model of a desired network performance. When a data source detects deteriorated performance, the analytics engine recommends adjustments that can enhance performance. Also other configurations are possible, such as recommending corrective actions for identified issues in the network, identifying an endpoint, detecting potential security issues, and the like.

In wireless communication network architectures, such as 3GPP based networks, network analytics is executed by using network elements or network functions such as a network data analytics function (NWDAF) or management data analytics services (MDAS).

The NWDAF is part of the network architecture specified, for example, in 3GPP TS 23.501 "System Architecture for the 5G System; Stage 2" and uses the mechanisms and interfaces specified for 5GC, e.g. according to TS 23.501, TS 23.288, TSs related to OAM services, and the like.

The NWDAF is configured to interact with different entities for different purposes. Those purposes are, for example, data collection based on subscription to events provided by network functions such as AMF, SMF, AF, OAM, and the like, analytics and data collection using DCCF, storage and retrieval of information from ADRF, retrieval of information about NFs (e.g. from NRF for NF-related information), on demand provision of analytics to consumers, provision of bulked data to consumers, and the like.

It is possible to deploy a single instance or multiple instances of NWDAF in a communication network. When multiple NWDAFs exist, not all of them need to be able to provide the same type of analytics results, i.e. some of them can be specialized in providing certain types of analytics. An Analytics ID information element is used to identify the type of supported analytics that NWDAF can generate.

The NWDAF provides analytics to 5GC NFs and OAM. An NWDAF can be decomposed into two parts. An analytics logical function (AnLF) is able to perform inference, derive analytics information (i.e. derives statistics and/or predictions based on analytics consumer request) and expose analytics service i.e. Nnwdaf_AnalyticsSubscription or Nnwdaf_AnalyticsInfo. On the other hand, a model training logical function (MTLF) is configured to train Machine Learning (ML) models and exposes new training services (e.g. providing trained model). It is to be noted that a NWDAF can contain model training logical function, analytics logical function, or both.

It is to be noted that analytics information can be statistical information of the past events, or predictive information. Different NWDAF instances may be present in the network with possible specializations per type of analytics. The capabilities of a NWDAF instance are described in a NWDAF profile stored in the NRF.

In order to support NFs to discover and select an NWDAF instance containing MLTF, AnLF, or both, that is able to provide the required service (e.g. analytics exposure or ML model provisioning) for the required type of analytics, each NWDAF instance provides a list of supported analytics ID(s) (possibly per supported service) when registering to the NRF, in addition to other NRF registration elements of the NF profile. NFs requiring the discovery of an NWDAF instance that provides support for some specific service(s) for a specific type of analytics can then query the NRF for NWDAFs supporting the required service(s) and the required Analytics ID(s).

The specification 3GPP TS 23.288 "Architecture enhancements for 5G System (5GS) to support network data analytics services" describes procedures for a service consumer to subscribe/request to analytics offered by the NWDAF. When subscribing/requesting, the service consumer specifies the analytics ID to select the analytics service desired. Basically, a list of available analytics IDs is defined which represent the available analytics that the NWDAF offers, according to specification. The list contains a specified number of analytics for different purposes, such as Slice Load level information (Analytics ID: load level information), which is related to a load level of a network slice instance reported either as notification of crossing of a given threshold or as periodic notification (if no threshold is provided);

NF Load information (Analytics ID: NF load information), which is related load statistics or predictions information for specific NF(s);

UE mobility information (Analytics ID: UE Mobility), which is related to statistics or predictions on UE mobility;

UE Abnormal behavior information (Analytics ID: Abnormal behavior), which is related to a list of observed or expected exceptions, with Exception ID, Exception Level and other information, depending on the observed or expected exceptions;

Redundant Transmission Experience (Analytics ID: Redundant Transmission Experience), which is related to statistics or predictions aimed at supporting redundant transmission decisions for specified services.

It is to be noted that the list being defined contains also other analytics information besides those indicated above. Nevertheless, the analytics information being settable concern preset information of a limited number. That is, following the approach described in the standards (e.g. TS 23.288), an analytics service consumer can subscribe/request for an analytics service only by specifying one of the analytics IDs being available from the preset list. That is, the analytics service consumer is bound to specify the analytics it is interested in by setting Analytics ID attribute in the subscription/request message selected among the list of available IDs specified in TS 23.288.

However, in the future, with 5G and beyond, a consumer may need different analytics while the preset list may easily become hard to be maintained appropriately. Furthermore, the current approach of requesting/subscribing to analytics and selecting only the ones available from an exhaustive list is not flexible and also not scalable.

Therefore, it is desirable to provide a mechanism which allows a more flexible and scalable approach of providing network analytics services which allows that the network, such as the NWDAF or any other analytics producer, such as MDAS, is able to collect any data needed to provide any analytics (i.e. ones beyond those described in TS 23.288, for example) and to use AI/ML models for learning any data relationship.

In the following, different exemplifying embodiments will be described for illustrating a processing for improving network analytics by enabling to provide, to a service consumer, custom analytics service. For this, as an example of a communication network to which examples of embodiments may be applied, a communication network architecture based on 3GPP standards for a communication network, such as 5G/NR, is used, without restricting the embodiments to such an architecture, however. It is obvious for a person skilled in the art that the embodiments may also be applied to other kinds of communication networks, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication networks as well.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet, as well as with individual devices or groups of devices being not considered as a part of a network, such as monitoring devices like cameras, sensors, arrays of sensors, and the like. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element or network functions, such as core network control elements or functions, such as a NWDAF, an NRF, or other network elements or network functions, such as network functions representing a service consumer or data source element or function, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

For illustrative purposes, a network structure based on 3GPP is described in which examples of embodiments can be implemented. Specifically, in the following, a processing is described in which a service consumer requiring a network analytics service which is not included in the default list provided by the network can be provided with the requested service and information by the network. For the sake of illustration, a case is considered in which one or more NWDAFs are used as service providers for one service consumer. However, principles of the invention can be applied to cases where a different number of service consumers and/or service providers is involved.

Specifically, FIG. 1 shows a diagram illustrating an example of a system architecture of a communication network based on 3GPP in which examples of embodiments are implementable. It is to be noted that the illustration in FIG. 1 mainly shows those parts of a complete network architecture which are useful for understanding principles of embodiments of the disclosure, while other elements and interfaces are omitted in the illustration.

Reference number 20 denotes a network function (NF) which can be a service consumer or a data source in the network analytics service according to examples of embodiments. It is to be noted that while FIG. 1 shows only one NF 20, there can be more than one NF in the respective role.

Furthermore, as indicated in FIG. 1, NWDAF 30 is provided as a data analytics element or function. As indicated above, the NWDAF 30 can have an analytic logical function, a model training logical function, or both.

The NWDAF 30 and the NF 20 are connected with each other by different types of interfaces. For example, a Nnf interface is defined for the NWDAF to request subscription to data delivery for a particular context, to cancel subscription to data delivery and to request a specific report of data for a particular context. Another example is a Nnwdaf interface which is used to request subscription to network analytics delivery for a particular context, to cancel subscription to network analytics delivery and to request a specific report of network analytics for a particular context. Other interface types are also possible, e.g. to data sources for retrieving data required for model training (in the following referred to as Nxx interface, for example).

Reference sign 40 denotes a NRF as from which information about NFs (including the NWDAF 30) can be retrieved from any NF.

Basically, according to examples of embodiments, an analytics producer, such as an NWDAF or MDAS in OAM, is able to offer custom analytics to service consumers. By using this concept, combined with the usage of AI/ML models for network analytics, an analytics producer is able to satisfy any analytics request that can be produced using available/collectable data. In this way, an analytics consumer is allowed to customize the analytics required based on requirements of each analytics service consumer. The analytics service consumer, after being informed about the data that can be collected by the analytics producer, is able, on the basis of the configurations according to examples of embodiments, to configure the analytics it would like to receive. By means of this, it is possible to introduce, in the 5GS and other communication network types, a higher flexibility and customizability in the analytics production process.

Also referring to the 3GPP example illustrated also in connection with FIG. 1, according to examples of embodiments, analytics services, such as a 3GPP defined AnalyticsSubscription service, and machine learning model provision services, such as a MLModelProvision service, are configured in such a way that the following processes are implemented.

By using AI/ML mechanism, a NWDAF is enabled to offer a custom analytics. For example, neural networks can be used which are able to approximate any function if properly trained. The NWDAF indicates to offer custom service so that a consumer or the network is able to recognize this ability.

A new analytics is introduced that allows a consumer to request any analytic. For this, required information specifying a data input that needs to be utilized, an expected output and how to label the input are provided.

The NWDAF is configured to select an available model, for example an untrained or partially trained model, that can support the required analytics (i.e., the model that is able to process those input data and provide the required output) or build it. Then, the NWDAF trains the model and can then produce the custom analytic.

Furthermore, the NWDAF can indicate that the new service created is available for all consumers or can keep the service private to only the consumer that requested it. This is to be indicated accordingly (e.g. in an NRF entry) so that it can be determined whether a trained model can be consumed/utilized by all consumers or only by specific (i.e. authorized) consumer(s).

For example, in the context of the 3GPP based network structure, examples of embodiments lead to an extension of the 3GPP-defined analytics mechanism by introducing the following parts.

A procedure to discover analytics producers able to offer custom analytics and able to collect the needed data is provided. This includes enhancements of the Nnrf_NF-Discovery service as well as extension of the NWDAFs profile stored at NRF to include the list of available/collectable data.

An identification, such as a new analytics ID, is provided that allows an analytics consumer to request/subscribe to custom analytics.

A procedure is provided so as to request/subscribe to analytics service to allow an analytics consumer to specify how to build the custom analytics service. This includes, among others, information about the data to be used for building the analytics and the expected output report.

Analytics producers are provided with a functionality to offer the custom analytics created to all future consumers or to keep it private to a specific consumer. In this way, the analytics producer can offer, depending on the consumer, customized analytics services. For example, a customized service could be provided to premium consumers.

In order to provide such elements, the following service parameters are provided according to examples of embodiments:

Input data: information about data that need to be collected as NF load, UE mobility information, etc.;

Type of analytics: determines what sort of analytics is requested, such as whether forecasting or classification is requested;

Output data: the analytics requested, for example information like "UE registered in a Network Slice/Network Slice instance";

Time granularity: time granularity of the output desired; this implies that the input data have a time granularity lower or equal to this;

Area of interest: this indicates the (network, geographical, hierarchical or the like) area from where the data should be collected.

Other parameter: other information which can be defined as required, such as labelling (e.g., by using a threshold which is to be considered for determining anomaly), information that the consumer would like to receive in the analytics report, such as for example NF instance ID, NF status, NF resource usage, and the like.

Figure 2:
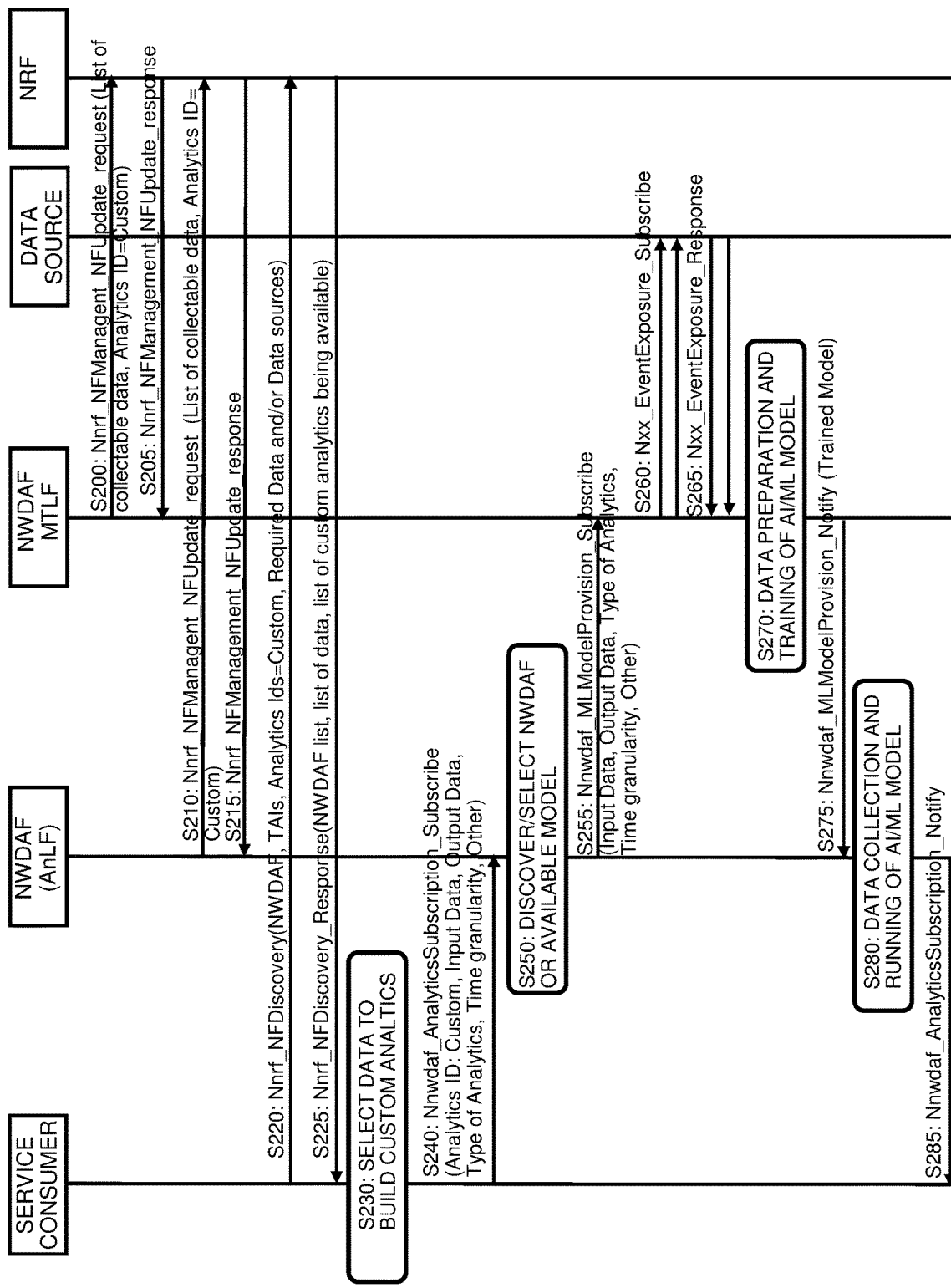
FIG. 2 shows a signaling diagram illustrating an example of a procedure allowing to provide custom analytics to a service consumer.

Next, with reference to FIG. 2, a processing is described illustrating a configuration allowing to offer and subscribe to custom analytics service in a 3GPP scenario.

As indicated above, and as explained in the following, in the exemplary implementation in 3GPP context, it is required that that following enhancements of services and/or NF functionalities are considered:

NWDAFs profile and NF profile registration and update services are to be set according to examples of embodiments;

Enhancement of NWDAF Discovery service is to be considered;

Enhancement of Analytics Subscription/Request services is to be considered;

Enhancement of NWDAF including MTLF capabilities is to be considered so as to enable it to build or retrieve an untrained or partially trained ML model able to process the data required, i.e., following the requirements provided by the analytics consumer;

Registration of novel custom analytics services per consumer is to be enabled.

Specifically, FIG. 2 shows a signaling diagram explaining an example of a procedure in which one service consumer, a NWDAF with AnLF, a NWDAF with MTLF, a NRF, and one or more NF representing data sources are used, wherein, as indicated above, these numbers are only an example and can be changed as required.

In S200, the NWDAF containing MTLF registers/updates (e.g. with a Nnrf_NFManagement_NFUpdate_request message) its profile at the NRF to include a list of available/collectable data and that it is able to offer custom analytics (analytics ID=custom). The list of collectable data may be either the information that can be collected from each source (e.g., UE locations from AMF) and/or the available data sources (e.g., AMF, SMF, etc.) from which data can be collected.

In S205, the NRF acknowledges to the NWDAF (e.g. with a Nnrf_NFManagement_NFUpdate_response message) that the profile has been registered/updated.

In S210, similarly to S200, the NWDAF containing AnLF registers/updates its profile at the NRF (e.g. with a Nnrf_NFManagement_NFUpdate_request message).

In S215, similarly to S205, the NRF acknowledges to the NWDAF (e.g. with a Nnrf_NFManagement_NFUpdate_response message) that the profile has been registered/updated.

In S220, a network element or network function which represents a service consumer is interested in a specific analytics service. Specifically, the specific analytics service is a network analytics for which no preset analytics ID exists, i.e. there is no default analytics ID as described above. For example, the analytics service consumer is interested in forecasting the "Number of UEs registered in a Network Slice/Network Slice instance" which is not available as Analytics ID according to the list of TS 23.288. The service consumer is thus interested in NWDAFs that are able to predict the number of UEs registered in a NW slice or NW slice instance based on input data from AMF/OAM (e.g. by subscribing to UE registration events).

Therefore, the service consumer selects "custom analytics" ID for requesting to provide the required analytics. Thus, the service consumer sends (e.g. with a Nnrf_NFDiscovery message) to the NRF a discovery request in which, among other, attributes for the Analytics ID is set to the "Custom Analytics", wherein also information about input data (and/or input data sources) needed for setting up the requested custom analytics are included.

After receiving the request in S220, the NWDAF may check whether the analytics service consumer sending the request in S220 is allowed to access the required information. For example, for this purpose, the NRF may maintain a list of NF consumers allowed to request "Custom Analytics" and/or required data/data sources. If the check is affirmative, the NRF returns in S225 a list of NWDAFs that support custom analytics and have access to the required information (e.g. with a Nnrf_NFDiscovery_response message). The response message may also include a full list of collectable data per discovered NWDAF instance. Furthermore, the NRF returns to the service consumer a list of already available custom analytics in case this can be exposed to other consumers.

After receiving the response in S225, the service consumer checks whether the information included in the response indicate an available custom analytics which satisfy the request. In the following it is assumed that none of the available custom analytics is appropriate.

In S230, as no available custom analytics can satisfy the request, the service consumer selects an NWDAF (AnLF) instance and the input data from the available/collectable data of that NWDAF, which the service consumer wants the NWDAF to use to build the desired custom analytics service.

Then, in S240, for example by using a Nnwdaf_AnalyticsSubscription_Subscribe message, the service consumer contacts the selected NWDAF (AnLF) and subscribes to the selected NWDAF (AnLF) wherein it is specified that a custom analytics is requested. In addition, information related to the custom analytics are provided, such as the information to be used as input data, the information expected as output analytics, the type of analytics (e.g., whether a forecast or a classification is required), the time period, reporting interval, an area of interest, and other information, such as for example how to label the data (e.g., the level above which an information has to be considered as anomaly or not) or its interest in capturing spatial trends (in this case the NWDAF (MTLF) may be configured to not aggregate the data collected from the area of interest and should process them using for example convolutional layer as first layer of the AI/ML model).

In S250, the NWDAF (AnLF) checks whether it has already a trained AI/ML model that provides the requested analytics. If this is the case, the trained AI/ML model can be used as described later in S280. However, in the present example, it is assumed that there is no trained AI/ML model. Therefore, the NWDAF (AnLF) determines and selects a NWDAF (MTLF) that has access to the requested data.

In S255, the NWDAF (AnLF) requests/subscribes (for example by using a Nnwdaf_MLModelProvision_Subscribe message) to the NWDAF (MTLF) to receive a trained AI/ML model for providing the custom analytics requested by the analytics consumer. The information provided by the service consumer in S240 about how to build the custom analytics service are forwarded to the NWDAF (MTLF).

In S260, the NWDAF (MTLF) requests/subscribes to data source(s) for the information needed to train an AI/ML model for providing the custom analytics (in FIG. 2, this is indicated by a corresponding Nxx_EventExposure_Subscribe message). According to examples of embodiments, the information captures the statistical properties required for building the analytics, i.e., the time granularity of the data collected should be equal or lower to the one specified by the analytics consumer in S240. In this context, it is to be noted that input data may also be requested and retrieved from an ADRF.

In S265, the Data source(s) (including ADRF) provide/notify the NWDAF (MTLF) with the requested information, for example by means of Nxx_EventExposure_Response messages.

In S270, the NWDAF (MTLF) selects an (e.g. untrained or partially trained) AI/ML model that is able to process the information collected and to capture the required trends/analytics. Then, the NWDAF (MTLF) prepares the data following the instructions provided by the service consumer (with the information received in S255). Furthermore, the NWDAF (MTLF) trains the AI/ML model according to the data obtained.

In S275, the trained model is sent to the NWDAF (AnLF) e.g. by means of a Nnwdaf_MLModelProvision_Notify message.

It is to be noted that it is also possible that the NWDAF (MTLF) already has a model as requested in S255 that can be used for requested purpose (similar to S250). In this case, the trained model can be directly used in S275, rather that conducting the training process beginning at S260.

In S280, the NWDAF (AnLF) collects the information and runs the trained model to produce the custom analytics required. As indicated above, in case it is determined in S250 that a trained model is already present, this model can be directly used in S280 wherein S255 to S275 are omitted.

In S285, the NWDAF (AnLF) notifies e.g. with a Nnwdaf_AnalyticsSubscription_Notify message the service consumer regarding the desired custom analytics report including the output information specified by the service consumer during the subscription in S240.

It is to be noted, as indicated above, that in case the check of the information received in S225 reveals that at least one of the available custom analytics is appropriate, the service consumer can directly contact an NWDAF (AnLF) which offers this custom analytics and provides the information required (as done in S240, for example).

Figure 3:
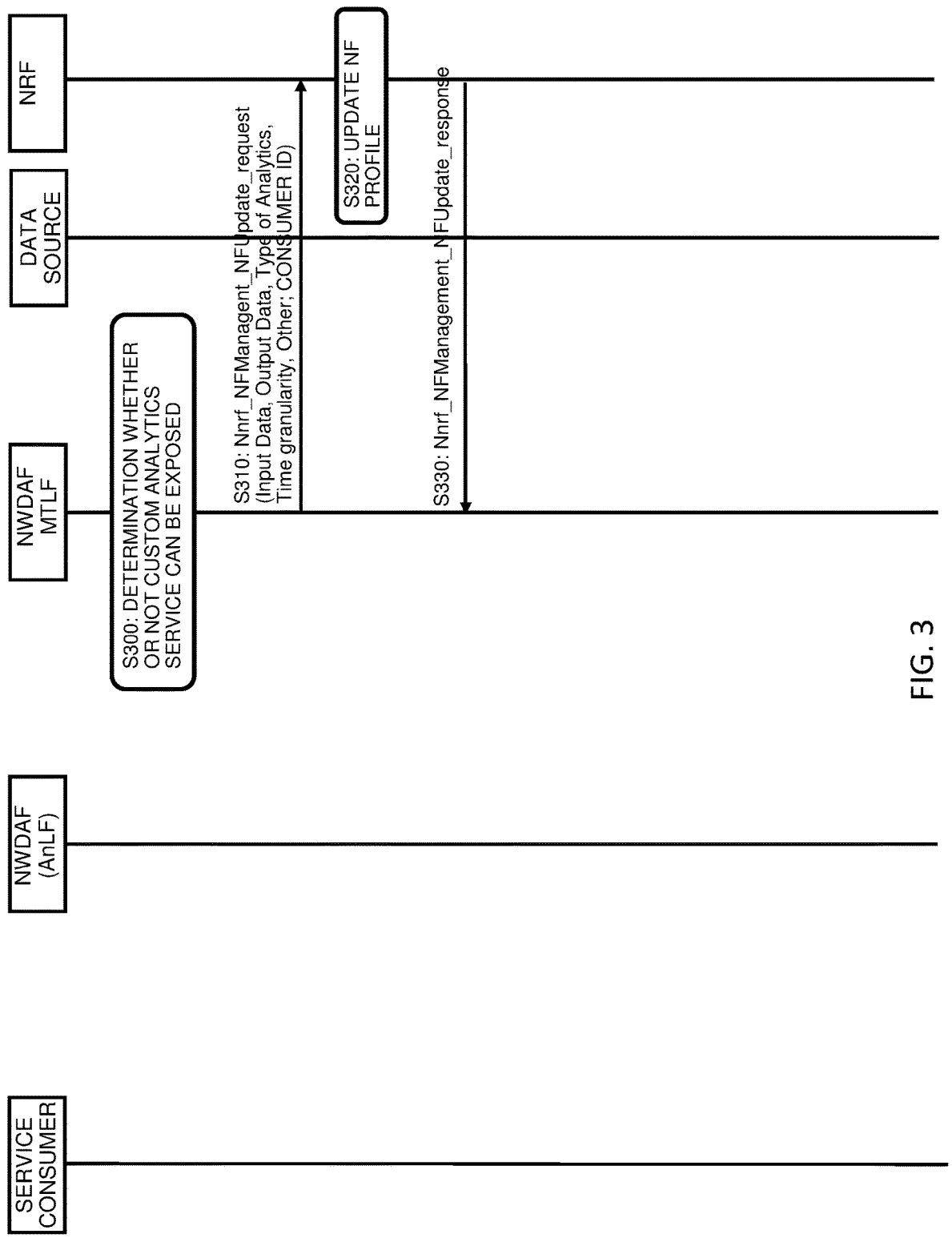
FIG. 3 shows a signaling diagram illustrating an example of a procedure allowing to provide custom analytics to a service consumer.

Next, with reference to FIG. 3, a processing is described illustrating a configuration following the processing of FIG. 2 where a procedure for determining whether the custom analytics can be offered to other/all future consumers or is to be kept private to a specific consumer.

Specifically, FIG. 3 shows a signaling diagram representing a supplement to the signaling diagram of FIG. 2 and illustrates a process conducted, for example, subsequent to S285.

In S300, the NWDAF (MTLF) which has trained the AI/ML model in S270, determines if the new custom analytics can be exposed to other service consumers or if it should be kept private to the analytics consumer that requested it. That is, the NWDAF (MTLF) is configured to decide whether the system is allowed to offer customized analytics services based on the consumer. For example, the decision is based on the type of data used for the analytics, the type of network element or network function representing the service consumer, and the like.

In S310, the NWDAF (MTLF) registers the novel custom analytics updating its profile and specifying the analytics description/meta data (e.g. by using a Nnrf_NFManagement_NFUpdate_request message). Depending on the decision in S300, the profile is updated also in connection with the consumer ID. That is, the consumer ID is utilized when the custom analytics service is to be kept private, so as to prevent other consumers to get access to the custom analytics if needed. In this case, the NWDAF (MTLF) can also be configured to inform the NWDAFs (AnLF) that already have received the model for providing the new custom analytics (e.g. in S285) that the analytics service should be consumed only by the specific consumer(s).

In S320, the NRF updates the NF profile of the NWDAF (MTLF).

In S330, the NRF acknowledges (e.g. by using a Nnrf_NFManagement_NFUpdate_response message) that the profile has been updated.

It is to be noted that, while the diagrams in FIGS. 2 and 3 shows separate NWDAF (AnLF) and NWDAF (MTLF), examples of embodiments are also applicable to scenarios where one NWDAF contains both AnLF and MTLF functions. In this case, internal communication between the functions is used for exchanging the data required.

As described above, for achieving the solution allowing to provide custom analytics, measures are proposed which modify or supplement present mechanisms of subscription and request procedures. In the case of a 3GPP system as described above as an example, these measures are related to changes or supplements to Nnwdaf_AnalyticsSubscription_Subscribe, Nnwdaf_AnalyticsInfo_Request and Nnwdaf_MLModelProvision_Subscribe procedure. Specifically, the following is considered:

New Input Data attribute to specify the data and/or data sources to be used as input for the custom analytics service.

New Output data attribute to specify the expected output of the custom analytics service.

New Type of analytics attribute to specify if the analytics required is e.g., a classification, a forecasting or a clustering.

New Time granularity attribute to specify, for example, a required minimum periodicity of data collection events that should be captured by the data collected.

New Other attribute to include extra information useful to build the novel custom analytics service requested as how to label the collected data.

Extension of the list of Analytics IDs to include CustomID.

Furthermore, according to examples of embodiments changes or supplements of present mechanisms of registration and updating are proposed. Specifically, in the 3GPP scenario, these concern e.g. Nnrf_NFManagement_Register and Nnrf_NFManagement_NFUpdate:

New List of collectable data attribute to include in the NF profile the list of data (e.g. data types such as indicated, for example in TS 23.288 as indicated above) and/or data sources that can be accessed.

Support to CustomID Analytics ID.

Figure 4:
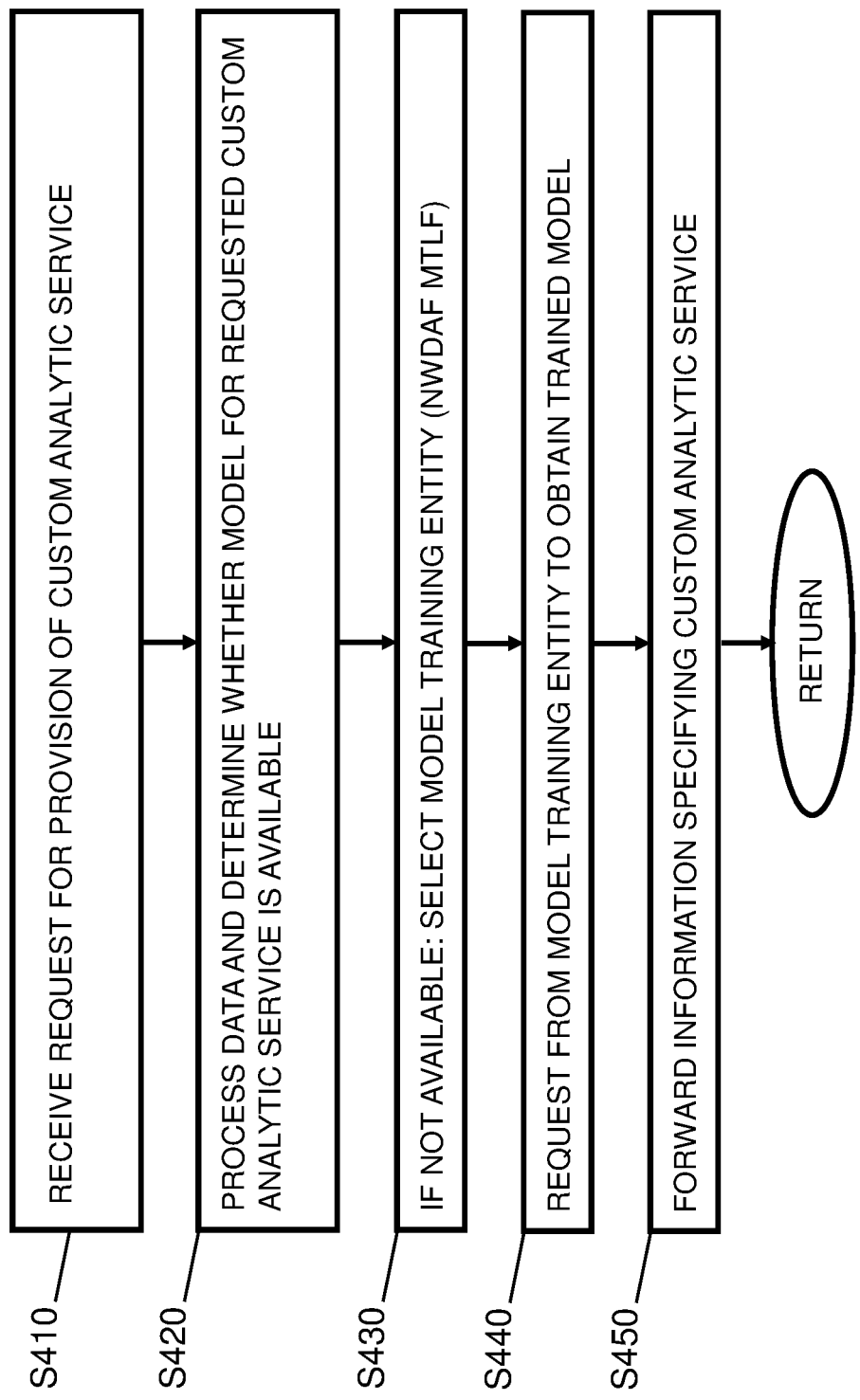
FIG. 4 shows a flow chart of a processing conducted in a network element or network function (i.e. NWDAF AnLF) according to some examples of embodiments.

FIG. 4 shows a flow chart of a processing executed by a network element or network function configured to operate as a network data analytics entity and having an analytics logical function. That is, FIG. 4 shows a flowchart related to a processing conducted by a NWDAF (AnLF) entity 30 as also described in connection with FIGS. 2 and 3.

In S410, the NWDAF (AnLF) receives a request, from a service consumer, for provision of a custom analytics service. According to examples of embodiments, the request comprises information specifying the custom analytics service. Specifically, for example, the information specifying the custom analytics service comprises at least one of
an indication element for indicating that a custom analytics service is requested (Custom Analytics ID), information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service.

In S420, the NWDAF (AnLF) processes data retrieved from the request for determining whether a model (trained AI/ML model, for example) for providing the requested custom analytics service is already prepared (i.e. available).

In S430, in case the determination is negative, the NWDAF (AnLF) determines and selects a model training entity (i.e. NWDAF (MTLF)) configured to operate as a network data analytics entity and having a model training logical function which has access to data required for the requested custom analytics service.

In S440, NWDAF (AnLF) requests, from the selected model training entity (i.e. NWDAF (MTLF)) to obtain a trained model capable of providing the requested custom analytics service.

For this, in S450, the NWDAF (AnLF) forwards the information specifying the custom analytics service to the selected model training entity which was received in S410.

According to further examples of embodiments, the NWDAF (AnLF) receives, from the selected model training entity (NWDAF (MTLF)), a trained model. Then, the NWDAF (AnLF) collects data required for the custom analytics service and runs the trained model using the collected data.

Then, the NWDAF (AnLF) provides, to the service consumer from which the request in S410 was received, a custom analytics report representing a result of running the trained model. The report includes output information as specified in the information included in the request from the service consumer received in S410.

Moreover, according to examples of embodiments, when the determination whether a model for providing the requested custom analytics service is prepared is affirmative in S420, the NWDAF (AnLF) directly collects data required for the custom analytics service (i.e. it does not involve the NWDAF (MTLF)). Similarly to the above described process, the NWDAF (AnLF) runs the (already prepared) model using the collected data. Then, the NWDAF (AnLF) provides, to the service consumer, a custom analytics report representing a result of running the prepared model, the report including output information as specified in the information included in the request from the service consumer.

In addition, according to examples of embodiments, before receiving and processing a request for provision of custom analytics (in S410), the NWDAF (AnLF) is configured to register or update profile information specifying the network data analytics entity having the analytics logical function in a network repository element or a network repository function (i.e. the NRF). The profile information comprises a list of available or collectable data and information indicating the ability to provide custom analytics services.

Figure 5:
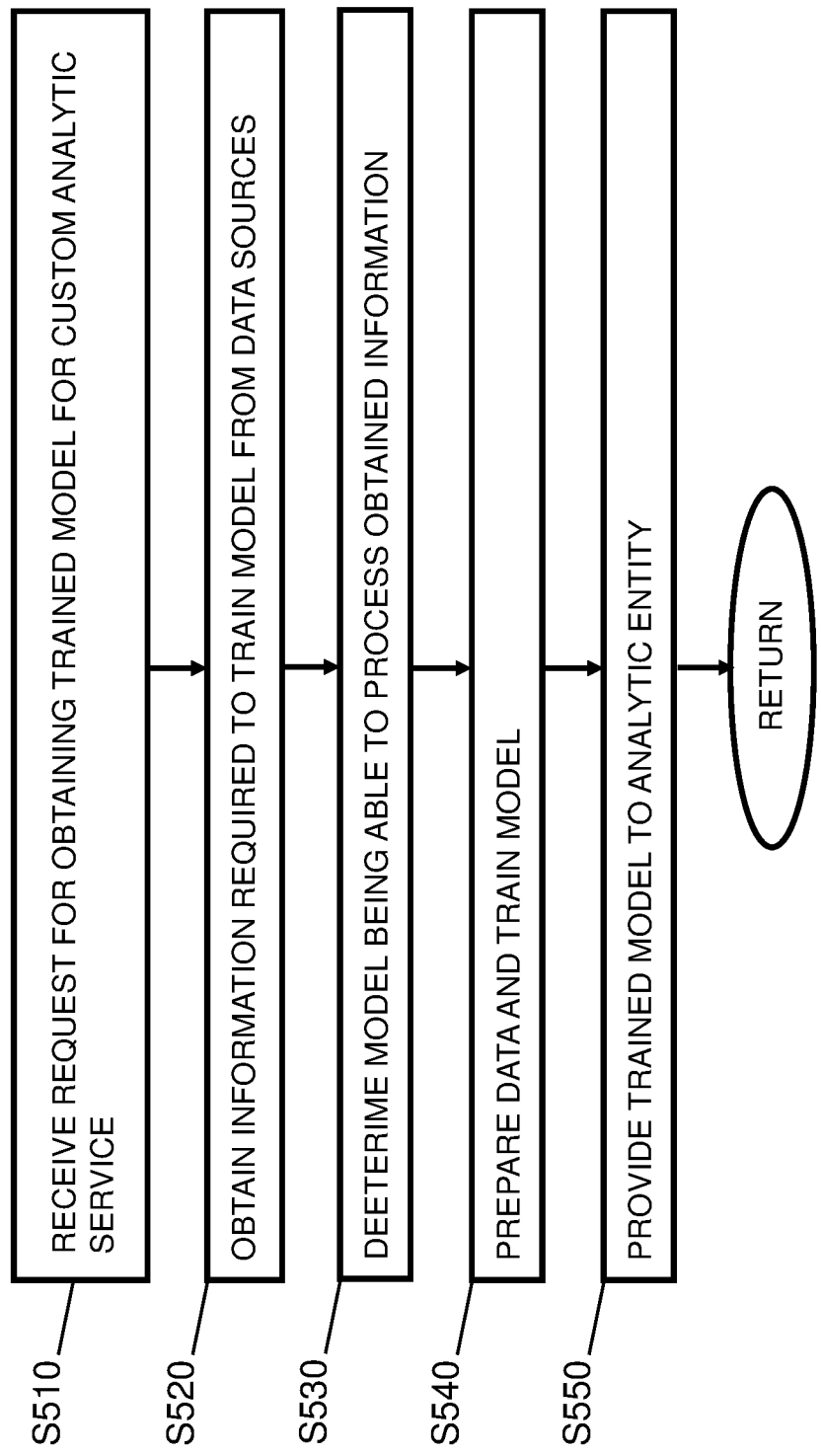
FIG. 5 shows a flow chart of a processing conducted in a network element or network function (i.e. NWDAF MTLF) according to some examples of embodiments.

FIG. 5 shows a flow chart of a processing executed by a network element or network function configured to operate e.g. as a network data analytics entity and has a model training logical function. That is, FIG. 5 shows a flowchart related to a processing conducted by a NWDAF (MTLF) entity 30 as also described in connection with FIGS. 2 and 3.

In S510, the NWDAF (MTLF) entity 30 receives, from an analytic entity, such as the NWDAF (AnLF) entity 30, a request (e.g. a subscription) to obtain a trained model capable of providing a custom analytics service. The request comprising information specifying the custom analytics service, wherein the corresponding information comprises one or more of the following: an indication element for indicating that a custom analytics service is requested (i.e. Custom analytics ID, for example), information about input data related to the custom analytics service, information indicating output data expected from the custom analytics service, information indicating a type of analytic of the custom analytics service (e.g. forecast, classification, or the like), information indicating a time period for the custom analytics service, information indicating a reporting interval for the custom analytics service, information indicating how to label data of the custom analytics service (anomaly level or the like), and information indicating that spatial trends are to be captured by the custom analytics service.

In S520, the NWDAF (MTLF) entity 30 obtains, from data sources, information required to train a model for providing the requested custom analytics service. For example, the data sources comprise at least one of a communication network element or communication network function (e.g. AMF, SMF, NF etc.), and an analytic data repository entity (ADRF).

In S530, the NWDAF (MTLF) entity 30 determines a model being able to process the obtained information. For example, the NWDAF (MTLF) entity 30 selects an untrained or partially trained model that is able to process the collected information and to provide the required trends/analytics).

In S540, the NWDAF (MTLF) entity 30 prepares the data according to the information specifying the custom analytics service, and trains the determined model using the prepared data.

In S550, the NWDAF (MTLF) entity 30 provides the trained model to the analytic entity sending the request in S510.

According to further examples of embodiments, the NWDAF (MTLF) entity 30 registers or updates profile information specifying the model training entity having the model training logical function in a network repository element or a network repository function (i.e. NRF 40). The profile information comprises a list of available or collectable data and information indicating the ability to provide trained models for custom analytics services.

Furthermore, according to further examples of embodiments, the NWDAF (MTLF) entity 30 determines whether the trained model (in S540) is allowed to be exposed to other service consumers (i.e. consumer being different to the one originally requesting the service).

In case the determination is negative, profile information is updated in a network repository element or a network repository function, wherein the profile information comprises a specification of the custom analytics service including a description of analytics and meta data, and an identification of the service consumer (e.g. consumer ID, consumer type, or the like) for which the custom analytics service is provided. In addition, the NWDAF (MTLF) entity 30 informs the analytic entity to which the trained model is sent in S550 that the custom analytics service is to be provided only to specific consumers.

On the other hand, in case the determination is affirmative, similar to the above, the profile information is updated in a network repository element or a network repository function. In this case, the profile information comprises a specification of the custom analytics service including a description of analytics and meta data. However, it is not limited that the analytics service (i.e. the model) is used only for the custom analytics service requested by specified consumers (i.e. the consumer originally requesting the service) but is allowed to be offered to other consumers. For this purpose, either the indication of the consumer ID or the like is omitted, or a specific information indication that the analytics service can be offered to other consumers is included in the registration.

Figure 6:
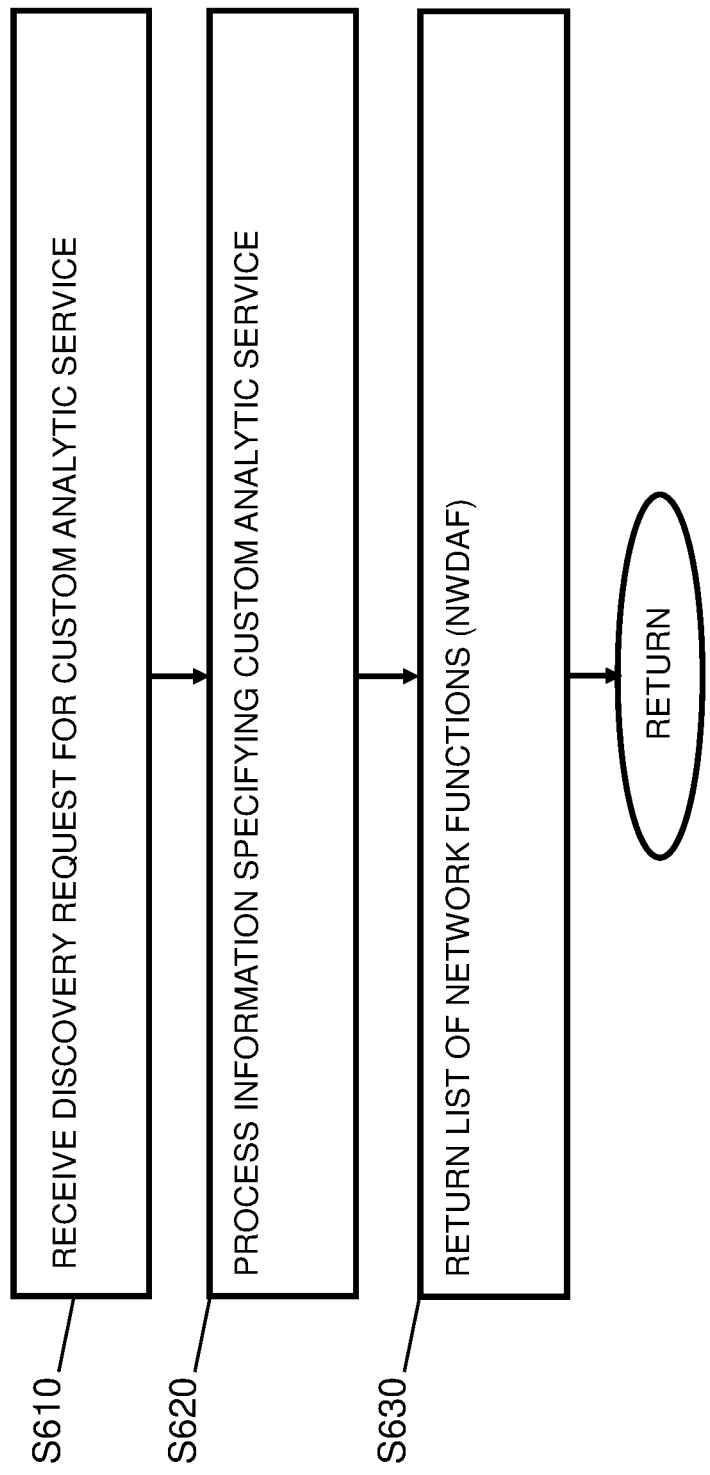
FIG. 6 shows a flow chart of a processing conducted in a network element or network function (i.e. NRF) according to some examples of embodiments.

FIG. 6 shows a flow chart of a processing executed by a network element or network function configured to operate as a network repository function. That is, FIG. 6 shows a flowchart related to a processing conducted by a NRF 40 as also described in connection with FIGS. 2 and 3.

In S610, the NRF 40 receives a discovery request from a service consumer (i.e. NF 20), indicating that a custom analytics service is requested. The request comprising information specifying at least one of input data and input data sources required for setting up the requested custom analytics service.

In S620, the NRF 40 processes the information comprised in the request. For example, according to further examples of embodiments, the NRF 40 checks whether the service consumer is allowed to access to custom analytics service or to required information for the requested custom analytics service. The further processing is conducted only in case the check is affirmative.

In S630, the NRF 40 returns, to the service consumer, a list of network functions supporting custom analytics services and having access to required information for the requested custom analytics service. According to further examples of embodiments, the list of network functions further includes an indication of collectable data per network function instance and a list of available custom analytics.

Moreover, according to further examples of embodiments, the NRF 40 receives a registration or update of profile information specifying a network entity having at least one of an analytics logical function and a model training logical function (i.e. from NWDAF (AnLF) or NWDAF (MTLS) for example). Depending on the provider of the profile information, the profile information comprises e.g. a list of available or collectable data and information indicating the ability to provide custom analytics services, or information indicating the ability to provide trained models for custom analytics services.

Figure 7:
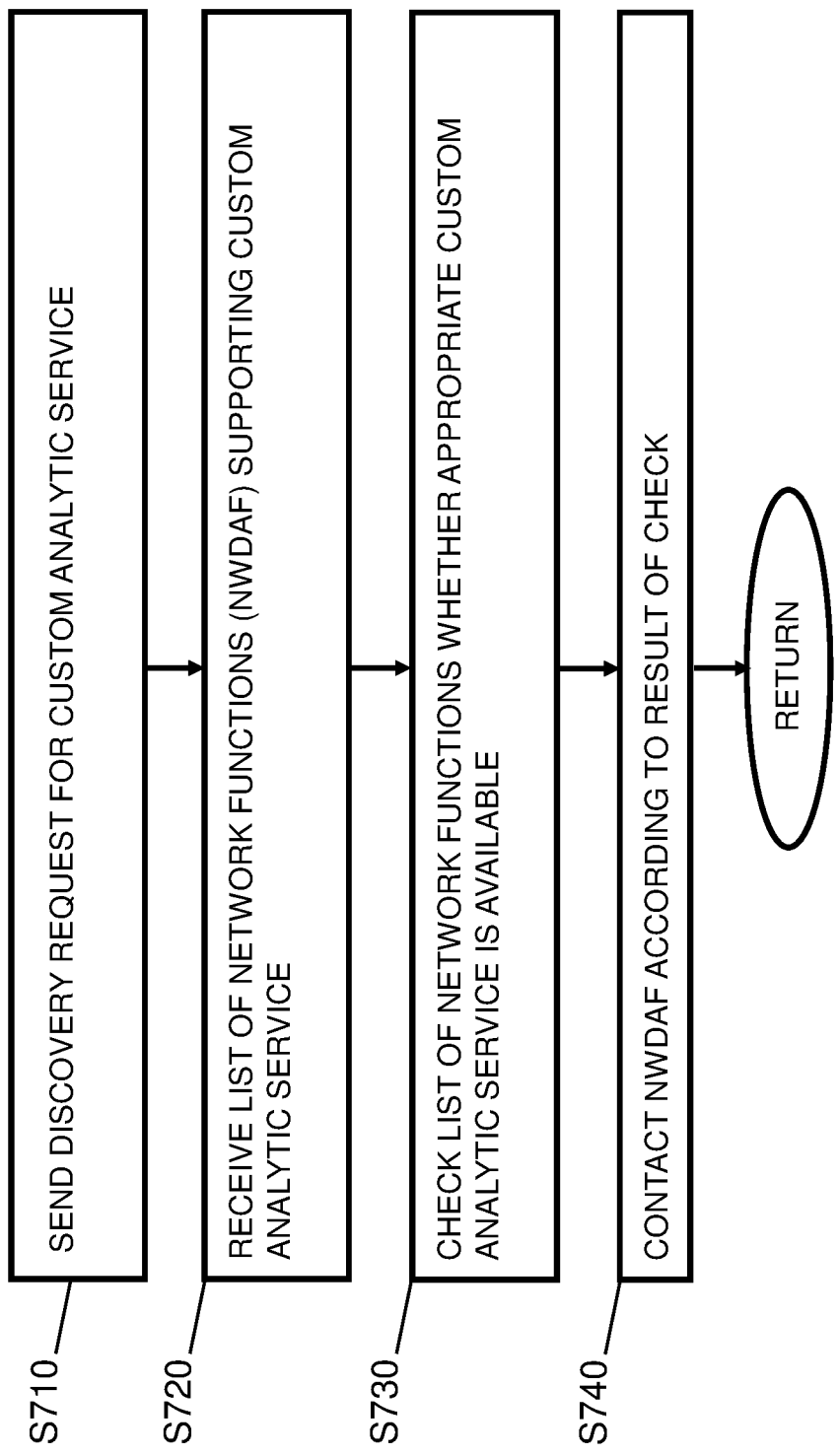
FIG. 7 shows a flow chart of a processing conducted in a network element or network function (i.e. service consumer network element or network function) according to some examples of embodiments.

FIG. 7 shows a flow chart of a processing executed by a network element or network function configured to operate as a service consumer. That is, FIG. 7 shows a flowchart related to a processing conducted by a NF 20 as also described in connection with FIGS. 2 and 3.

In S710, the NF 20 sends to a network repository entity (i.e. NRF 40) a discovery request indicating that a custom analytics service is requested. The request comprises information specifying at least one of input data and input data sources required for setting up the requested custom analytics service.

In S720, the NF 20 receives from the network repository entity a list of network functions supporting custom analytics services and having access to required information for the requested custom analytics service. According to examples of embodiments, the list of network functions may further include an indication of collectable data per network function instance and a list of available custom analytics.

In S730, the NF 20 checks whether the received list comprises a custom analytics service satisfying the requirements of the requested custom analytics service.

In S740, the NF 20 contacts a network function (i.e. a NWDAF, for example) according to a result of the check.

That is, according to examples of embodiments, in case the check results that the received list comprises a custom analytics service satisfying the requirements of the requested custom analytics service, the NF 20 contacts a corresponding network function providing the identified custom analytics service (i.e. NWDAF (AnLF)) and sends information specifying the custom analytics service. The information comprises, for example, at least one of an indication element for indicating the identified custom analytics service, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service (as also described above).

On the other hand, according to examples of embodiments, in case the check results that the received list does not comprise a custom analytics service satisfying the requirements of the requested custom analytics service, the NF 20 selects from the received list a network function configured to operate as an analytics entity having an analytics logical function (i.e. NWDAF (AnLF)) and input data from available or collectable data of the selected network function for building the requested custom analytics service. Then, the selected network function is contacted and a request for provision of a custom analytics service is sent. Again, the request comprises information specifying the custom analytics service, which may comprise one or more of an indication element for indicating that a custom analytics service is requested, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service.

Moreover, according to examples of embodiments, the NF 20 receives from the contacted network function a custom analytics report, the report including output information as specified in the information included in the request to the network function.

Figure 8:
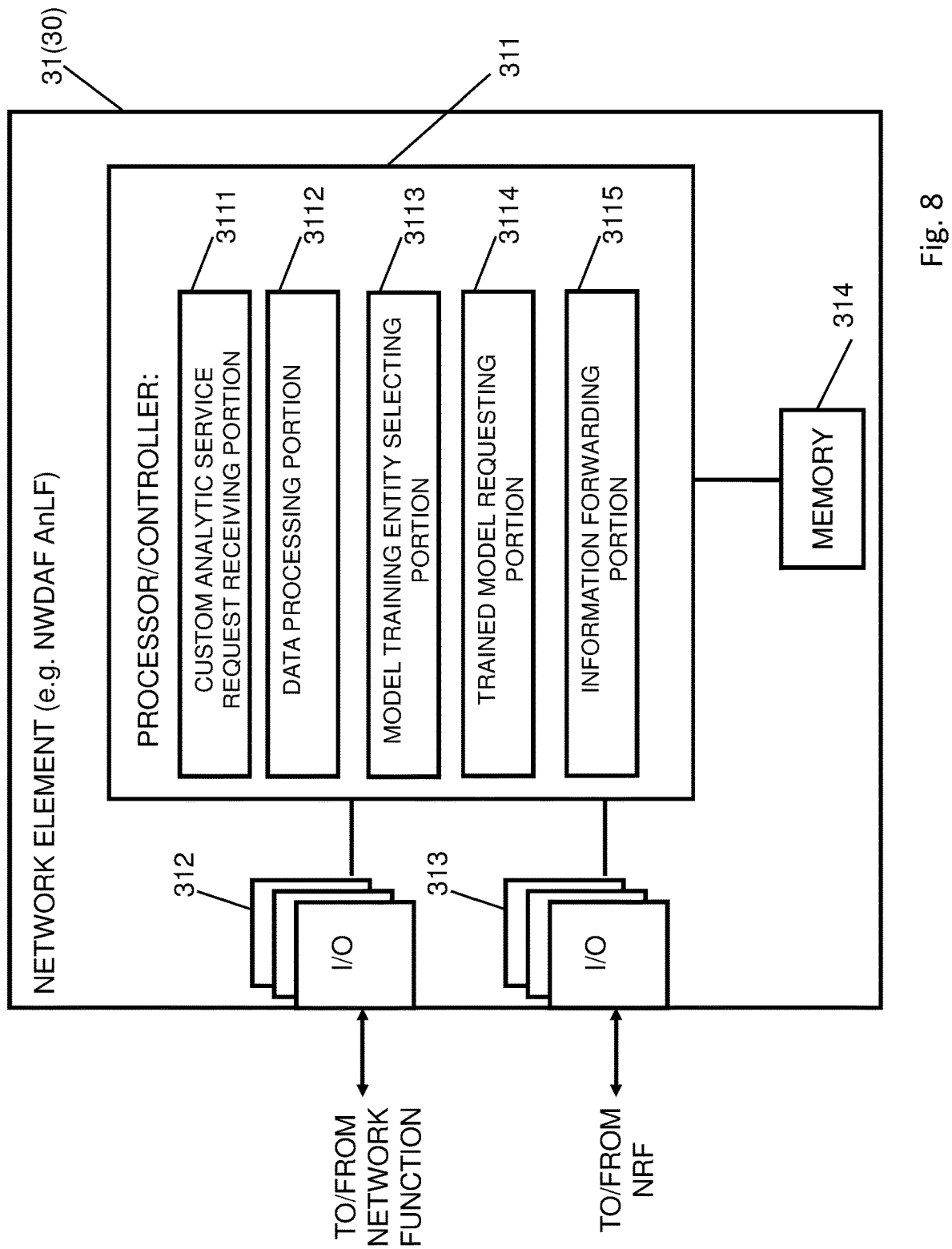
FIG. 8 shows a diagram of a network element or network function acting as an analytic function (i.e. NWDAF AnLF) according to some examples of embodiments.

FIG. 8 shows a diagram of a network element or function acting as network data analytics entity having an analytics logical function (i.e. NWDAF (AnLF)) 31 (30) according to some examples of embodiments, as described in connection with FIGS. 2 and 3, which is configured to conduct a processing according to examples of embodiments of the disclosure. It is to be noted that the network element or function such as the NWDAF (AnLF) 31 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The NWDAF (AnLF) 31 shown in FIG. 8 may include a processing circuitry, a processing function, a control unit or a processor 311, such as a CPU or the like, which is suitable for executing instructions given by programs or the like related to the control procedure. The processor 311 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 312 and 313 denote input/output (I/O) units or functions (interfaces) connected to the processor or processing function 311. The I/O units 312 may be used for communicating with network functions such as data sources or service consumers, as shown in FIG. 1. The I/O units 313 may be used for communication with a repository function such as NRF shown in FIG. 1. The I/O units 312 and 313 may be combined units including communication equipment towards several entities, or may include a distributed structure with a plurality of different interfaces for different entities. Reference sign 314 denotes a memory usable, for example, for storing data and programs to be executed by the processor or processing function 311 and/or as a working storage of the processor or processing function 311. It is to be noted that the memory 314 may be implemented by using one or more memory portions of the same or different type of memory.

The processor or processing function 311 is configured to execute processing related to the above described analytics procedure. In particular, the processor or processing circuitry or function 311 includes one or more of the following sub-portions. Sub-portion 3111 is a processing portion which is usable as a portion for receiving a request for custom analytics service. The portion 3111 may be configured to perform processing according to S410 of FIG. 4. Furthermore, the processor or processing circuitry or function 311 may include a sub-portion 3112 usable as a portion for processing data. The portion 3112 may be configured to perform a processing according to S420 of FIG. 4. In addition, the processor or processing circuitry or function 311 may include a sub-portion 3113 usable as a portion for selecting a model training entity. The portion 3113 may be configured to perform a processing according to S430 of FIG. 4. Furthermore, the processor or processing circuitry or function 311 may include a sub-portion 3114 usable as a portion for requesting a trained model. The portion 3114 may be configured to perform a processing according to S440 of FIG. 4. In addition, the processor or processing circuitry or function 311 may include a sub-portion 3115 usable as a portion for forwarding information. The portion 3115 may be configured to perform a processing according to S450 of FIG. 4.

Figure 9:
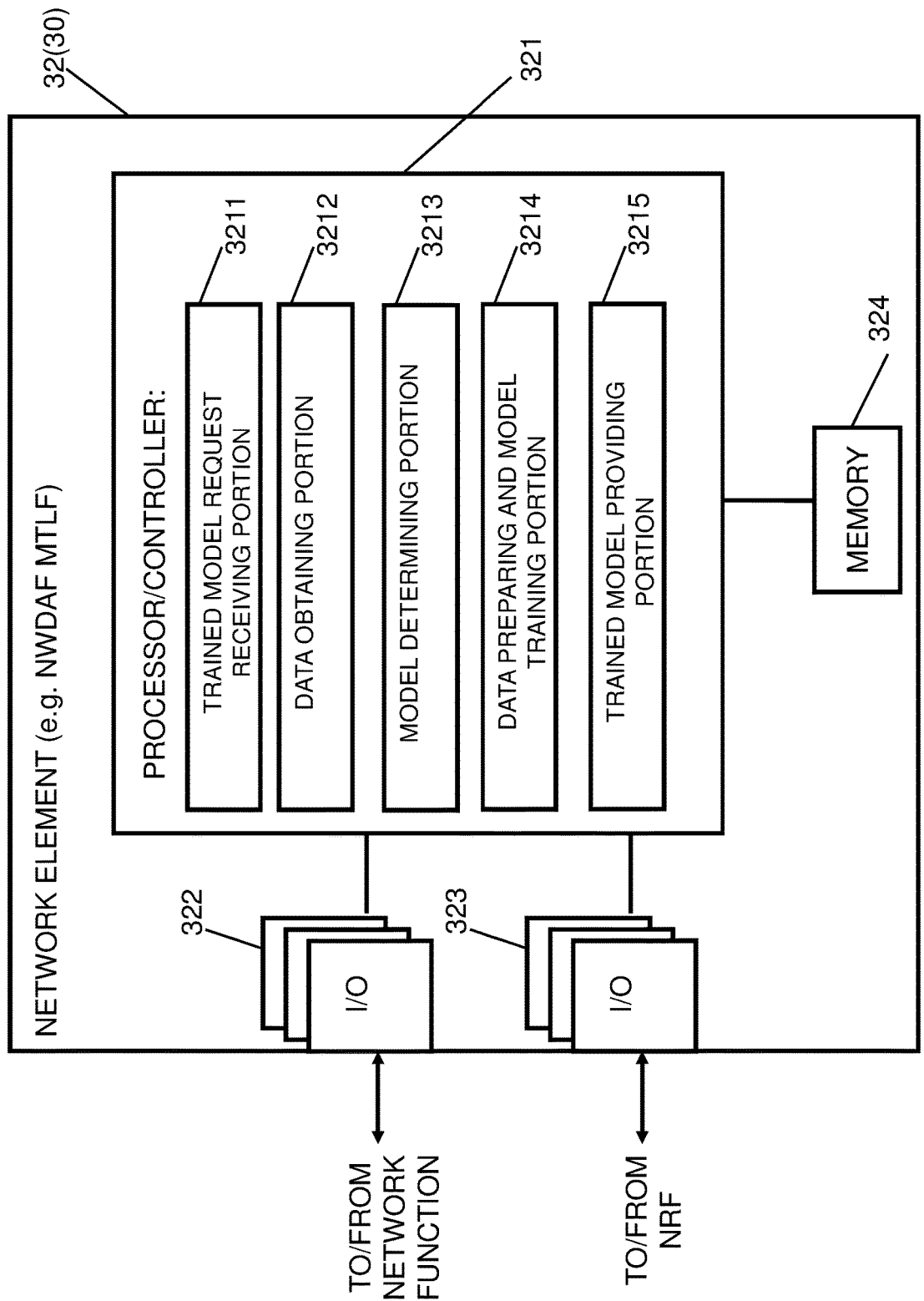
FIG. 9 shows a diagram of a network element or network function acting as a model training function (i.e. NWDAF MTLF) according to some examples of embodiments.

FIG. 9 shows a diagram of a network element or function acting as network data analytics entity having a model training logical function (i.e. NWDAF (MTLF)) 32 (30) according to some examples of embodiments, as described in connection with FIGS. 2 and 3, which is configured to conduct a processing according to examples of embodiments of the disclosure. It is to be noted that the network element or function such as the NWDAF (MTLF) 32 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The NWDAF (MTLF) 32 shown in FIG. 9 may include a processing circuitry, a processing function, a control unit or a processor 321, such as a CPU or the like, which is suitable for executing instructions given by programs or the like related to the control procedure. The processor 321 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 322 and 323 denote input/output (I/O) units or functions (interfaces) connected to the processor or processing function 321. The I/O units 322 may be used for communicating with network functions such as data sources or service consumers, as shown in FIG. 1. The I/O units 323 may be used for communication with a repository function such as NRF shown in FIG. 1. The I/O units 322 and 323 may be combined units including communication equipment towards several entities, or may include a distributed structure with a plurality of different interfaces for different entities. Reference sign 324 denotes a memory usable, for example, for storing data and programs to be executed by the processor or processing function 321 and/or as a working storage of the processor or processing function 321. It is to be noted that the memory 324 may be implemented by using one or more memory portions of the same or different type of memory.

The processor or processing function 321 is configured to execute processing related to the above described analytics procedure. In particular, the processor or processing circuitry or function 321 includes one or more of the following sub-portions. Sub-portion 3211 is a processing portion which is usable as a portion for receiving a request for a trained model. The portion 3211 may be configured to perform processing according to S510 of FIG. 5. Furthermore, the processor or processing circuitry or function 321 may include a sub-portion 3212 usable as a portion for obtaining data. The portion 3212 may be configured to perform a processing according to S520 of FIG. 5. In addition, the processor or processing circuitry or function 321 may include a sub-portion 3213 usable as a portion for determining a model. The portion 3213 may be configured to perform a processing according to S530 of FIG. 5. Furthermore, the processor or processing circuitry or function 321 may include a sub-portion 3214 usable as a portion for data preparing and model training. The portion 3214 may be configured to perform a processing according to S540 of FIG. 5. In addition, the processor or processing circuitry or function 321 may include a sub-portion 3215 usable as a portion for providing a trained model. The portion 3215 may be configured to perform a processing according to S550 of FIG. 5.

Figure 10:
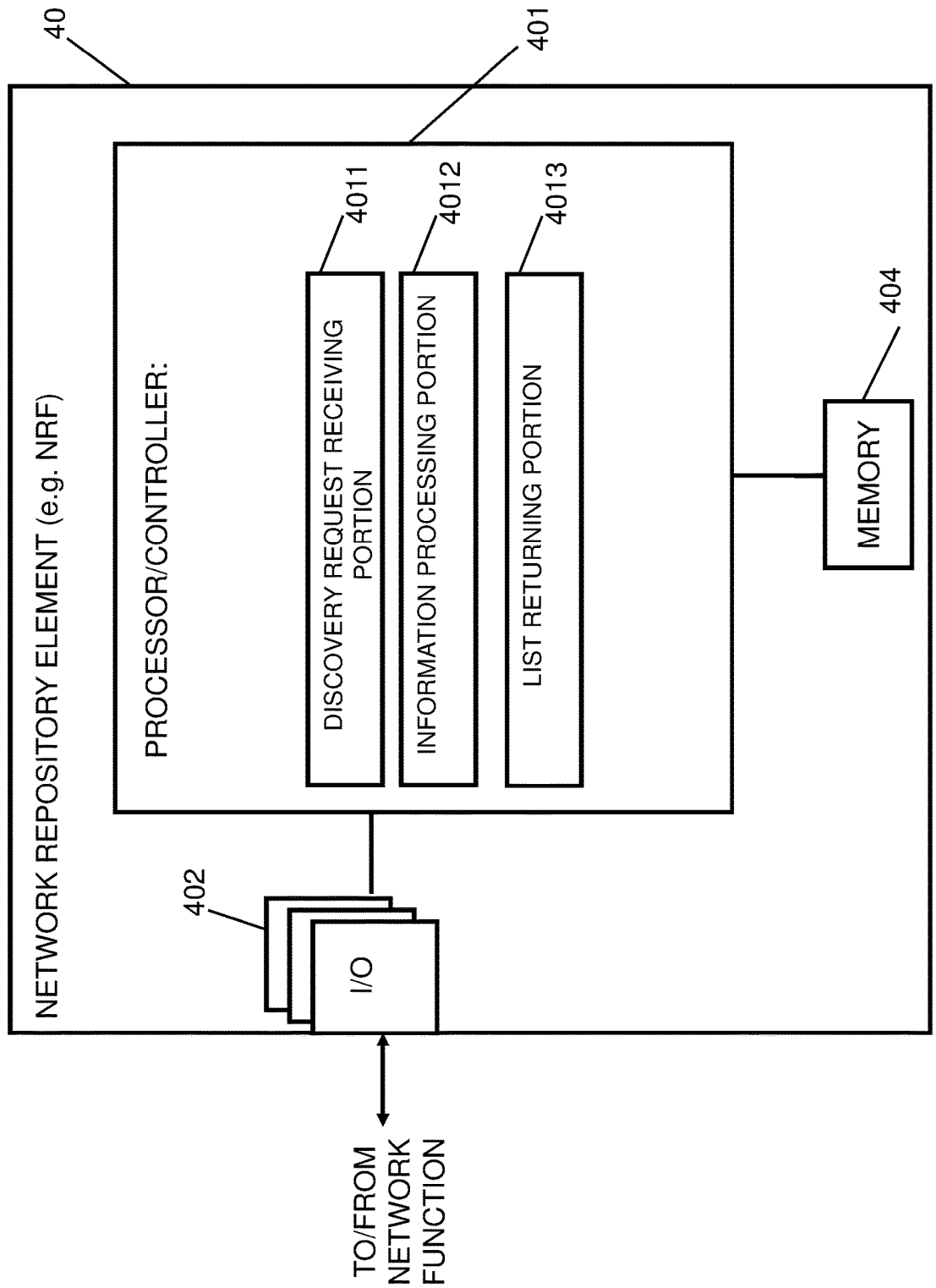
FIG. 10 shows a diagram of a network element or network function acting as a repository function (i.e. NRF) according to some examples of embodiments.

FIG. 10 shows a diagram of a network element or function acting as network repository entity or function (i.e. NRF) 40 according to some examples of embodiments, as described in connection with FIGS. 2 and 3, which is configured to conduct a processing according to examples of embodiments of the disclosure. It is to be noted that the network element or function such as the NRF 40 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The NRF 40 shown in FIG. 10 may include a processing circuitry, a processing function, a control unit or a processor 401, such as a CPU or the like, which is suitable for executing instructions given by programs or the like related to the control procedure. The processor 401 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 402 denotes input/output (I/O) units or functions (interfaces) connected to the processor or processing function 401. The I/O units 402 may be used for communicating with network functions, as shown in FIG. 1. The I/O units 402 may be combined units including communication equipment towards several entities, or may include a distributed structure with a plurality of different interfaces for different entities. Reference sign 404 denotes a memory usable, for example, for storing data and programs to be executed by the processor or processing function 401 and/or as a working storage of the processor or processing function 401. It is to be noted that the memory 404 may be implemented by using one or more memory portions of the same or different type of memory.

The processor or processing function 401 is configured to execute processing related to the above described analytics procedure. In particular, the processor or processing circuitry or function 401 includes one or more of the following sub-portions. Sub-portion 4011 is a processing portion which is usable as a portion for receiving a discovery request. The portion 4011 may be configured to perform processing according to S610 of FIG. 6. Furthermore, the processor or processing circuitry or function 401 may include a sub-portion 4012 usable as a portion for processing information. The portion 4012 may be configured to perform a processing according to S620 of FIG. 6. In addition, the processor or processing circuitry or function 401 may include a sub-portion 4013 usable as a portion for returning a list. The portion 4013 may be configured to perform a processing according to S630 of FIG. 6.

Figure 11:
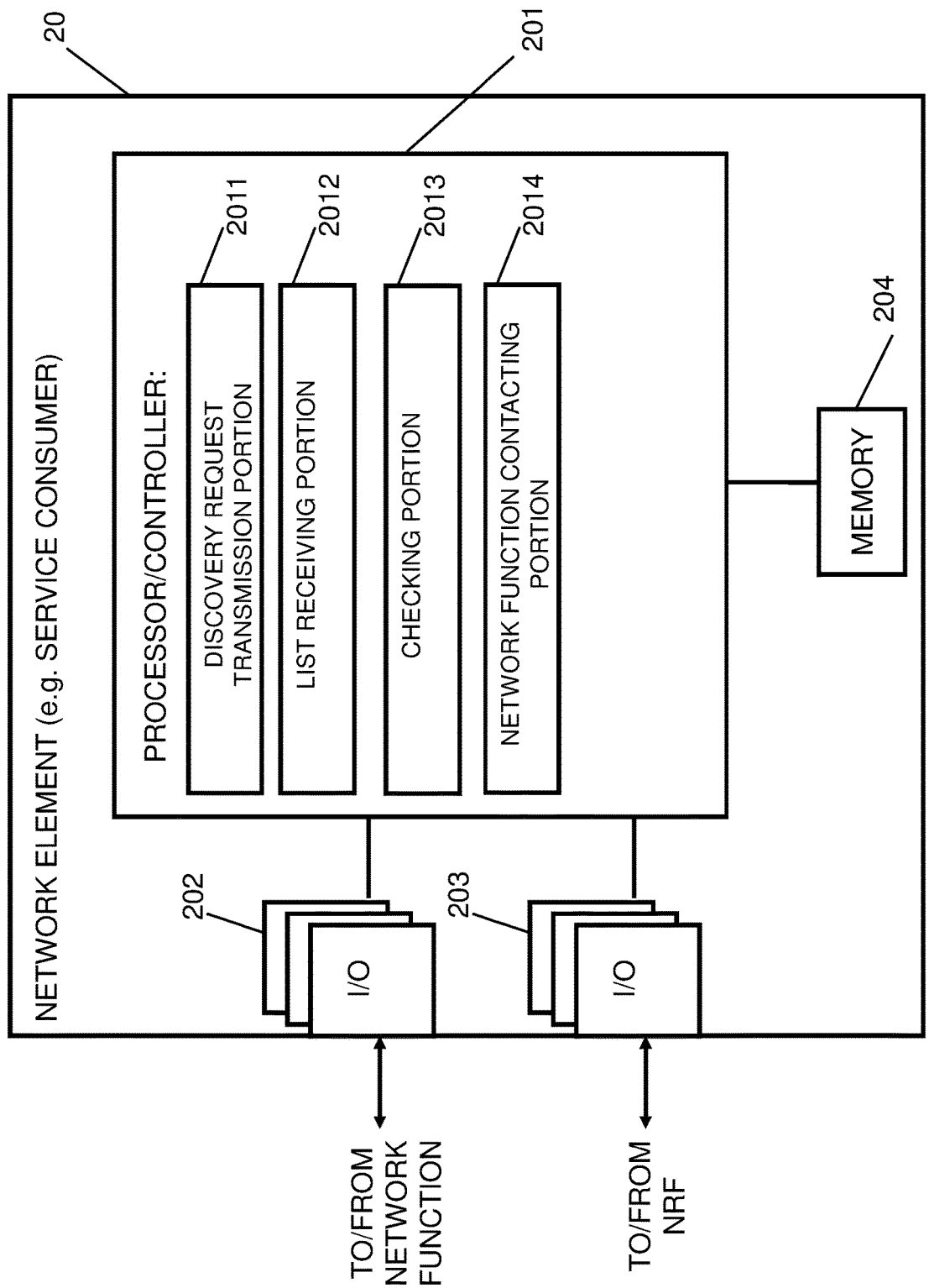
FIG. 11 shows a diagram of a network element or network function acting as a service consumer according to some examples of embodiments.

FIG. 11 shows a diagram of a network element or function acting as service consumer (i.e. NF) 20 according to some examples of embodiments, as described in connection with FIGS. 2 and 3, which is configured to conduct a processing according to examples of embodiments of the disclosure. It is to be noted that the network element or function such as the NF 20 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The NF 20 shown in FIG. 11 may include a processing circuitry, a processing function, a control unit or a processor 201, such as a CPU or the like, which is suitable for executing instructions given by programs or the like related to the control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 202 and 203 denote input/output (I/O) units or functions (interfaces) connected to the processor or processing function 201. The I/O units 202 may be used for communicating with network functions such as NWDAF 30, as shown in FIG. 1. The I/O units 203 may be used for communication with a repository function such as NRF shown in FIG. 1. The I/O units 202 and 203 may be combined units including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described analytics procedure. In particular, the processor or processing circuitry or function 201 includes one or more of the following sub-portions. Sub-portion 2011 is a processing portion which is usable as a portion for transmitting a discovery request. The portion 2011 may be configured to perform processing according to S710 of FIG. 7. Furthermore, the processor or processing circuitry or function 201 may include a sub-portion 2012 usable as a portion for receiving a list. The portion 2012 may be configured to perform a processing according to S720 of FIG. 7. In addition, the processor or processing circuitry or function 201 may include a sub-portion 2013 usable as a portion for checking. The portion 2013 may be configured to perform a processing according to S730 of FIG. 7. Furthermore, the processor or processing circuitry or function 201 may include a sub-portion 2014 usable as a portion for contacting a network function. The portion 2014 may be configured to perform a processing according to S740 of FIG. 7.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operation environment may be used in connection with examples of embodiments of the disclosure based on the principles defined. For example, as also indicated above, while examples of embodiments are related to a usage in connection with NWDAF, also other comparable configurations like management data analytics services (MDAS) can be used accordingly.

According to a further example of embodiments, there is provided, for example, an apparatus for use by a communication network element or communication network function configured to operate as an analytics entity and having an analytics logical function, the apparatus comprising means configured to receive a request, from a service consumer, for provision of a custom analytics service, the request comprising information specifying the custom analytics service, means configured to process data retrieved from the request for determining whether a model for providing the requested custom analytics service is prepared, and in case the determination is negative, means configured to determine and select a model training entity having a model training logical function which is able to create a model for custom analytics and has access to data required for the requested custom analytics service, means configured to request, from the selected model training entity, to obtain a trained model capable of providing the requested custom analytics service and means configured to forward the information specifying the custom analytics service to the selected model training entity.

Furthermore, according to some other examples of embodiments, the above defined apparatus may further comprise means for conducting at least one of the processing defined in the above described methods, for example a method according to that described in connection with FIG. 4.

According to a further example of embodiments, there is provided, for example, an apparatus for use by a communication network element or communication network function configured to operate as a model training entity having a model training logical function, the apparatus comprising means configured to receive, from an analytic entity, a request to obtain a trained model capable of providing a custom analytics service, the request comprising information specifying the custom analytics service, means configured to obtain, from data sources, information required to train a model for providing the requested custom analytics service, means configured to determine a model being able to process the obtained information, means configured to prepare data according to the information specifying the custom analytics service, means configured to train the model using the prepared data, and means configured to provide the trained model to the analytic entity.

Furthermore, according to some other examples of embodiments, the above defined apparatus may further comprise means for conducting at least one of the processing defined in the above described methods, for example a method according to that described in connection with FIG. 5.

According to a further example of embodiments, there is provided, for example, an apparatus for use by a communication network element or communication network function configured to operate as a network repository entity, the apparatus comprising means configured to receive a discovery request, from a service consumer, indicating that a custom analytics service is requested, the request comprising information specifying at least one of input data and input data sources required for setting up the requested custom analytics service, means configured to process the information comprised in the request, means configured to return, to the service consumer, a list of network functions supporting custom analytics services and having access to required information for the requested custom analytics service.

Furthermore, according to some other examples of embodiments, the above defined apparatus may further comprise means for conducting at least one of the processing defined in the above described methods, for example a method according to that described in connection with FIG. 6.

According to a further example of embodiments, there is provided, for example, an apparatus for use by a communication network element or communication network function configured to operate as a service consumer, the apparatus comprising means configured to send, to a network repository entity, a discovery request indicating that a custom analytics service is requested, the request comprising information specifying at least one of input data and input data sources required for setting up the requested custom analytics service, means configured to receive, from the network repository entity, a list of network functions supporting custom analytics services and having access to required information for the requested custom analytics service, means configured to check whether the received list comprises a custom analytics service satisfying the requirements of the requested custom analytics service and means configured to contact a network function according to a result of the check.

Furthermore, according to some other examples of embodiments, the above defined apparatus may further comprise means for conducting at least one of the processing defined in the above described methods, for example a method according to that described in connection with FIG. 7.

According to a further example of embodiments, there is provided, for example, a non-transitory computer readable medium comprising program instructions for causing an apparatus to perform, when used in a communication network element or function configured to operate as an analytics entity and having an analytics logical function, a processing comprising receiving a request, from a service consumer, for provision of a custom analytics service, the request comprising information specifying the custom analytics service, processing data retrieved from the request for determining whether a model for providing the requested custom analytics service is prepared, and in case the determination is negative, determining and selecting a model training entity having a model training logical function which is able to create a model for custom analytics and has access to data required for the requested custom analytics service, requesting, from the selected model training entity, to obtain a trained model capable of providing the requested custom analytics service and forwarding the information specifying the custom analytics service to the selected model training entity.

According to a further example of embodiments, there is provided, for example, a non-transitory computer readable medium comprising program instructions for causing an apparatus to perform, when used in a communication network element or function configured to operate as a model training entity having a model training logical function, a processing comprising receiving, from an analytic entity, a request to obtain a trained model capable of providing a custom analytics service, the request comprising information specifying the custom analytics service, obtaining, from data sources, information required to train a model for providing the requested custom analytics service, determining a model being able to process the obtained information, preparing data according to the information specifying the custom analytics service, training the model using the prepared data, and providing the trained model to the analytic entity.

According to a further example of embodiments, there is provided, for example, a non-transitory computer readable medium comprising program instructions for causing an apparatus to perform, when used in a communication network element or function configured to operate as a network repository entity, a processing comprising receiving a discovery request, from a service consumer, indicating that a custom analytics service is requested, the request comprising information specifying at least one of input data and input data sources required for setting up the requested custom analytics service, processing the information comprised in the request, returning, to the service consumer, a list of network functions supporting custom analytics services and having access to required information for the requested custom analytics service.

According to a further example of embodiments, there is provided, for example, a non-transitory computer readable medium comprising program instructions for causing an apparatus to perform, when used in a communication network element or function configured to operate as a service consumer, a processing comprising sending, to a network repository entity, a discovery request indicating that a custom analytics service is requested, the request comprising information specifying at least one of input data and input data sources required for setting up the requested custom analytics service, receiving, from the network repository entity, a list of network functions supporting custom analytics services and having access to required information for the requested custom analytics service, checking whether the received list comprises a custom analytics service satisfying the requirements of the requested custom analytics service and contacting a network function according to a result of the check.

According to examples of embodiments of the invention, the following aspects are provided:

Aspect 1: An apparatus for use by a communication network element or communication network function configured to operate as an analytics entity and having an analytics logical function, the apparatus comprising
  at least one processing circuitry, and
  at least one memory for storing instructions to be executed by the processing circuitry,
  wherein the at least one memory and the instructions are configured to, with the at least one processing circuitry, cause the apparatus at least:
  to receive a request, from a service consumer, for provision of a custom analytics service, the request comprising information specifying the custom analytics service, to process data retrieved from the request for determining whether a model for providing the requested custom analytics service is prepared, and in case the determination is negative, to determine and select a model training entity having a model training logical function which is able to create a model for custom analytics and has access to data required for the requested custom analytics service, to request, from the selected model training entity, to obtain a trained model capable of providing the requested custom analytics service and to forward the information specifying the custom analytics service to the selected model training entity.

Aspect 2: The apparatus according to aspect 1, wherein the information specifying the custom analytics service comprises at least one of:

an indication element for indicating that a custom analytics service is requested, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service.

Aspect 3: The apparatus according to aspect 1 or 2, wherein the at least one memory and the instructions are further configured to, with the at least one processing circuitry, cause the apparatus at least:

to receive, from the selected model training entity, a trained model, to collect data required for the custom analytics service, to run the trained model using the collected data, and to provide, to the service consumer, a custom analytics report representing a result of running the trained model, the report including output information as specified in the information included in the request from the service consumer.

Aspect 4: The apparatus according to aspect 1 or 2, wherein the at least one memory and the instructions are further configured to, with the at least one processing circuitry, cause the apparatus at least:

when the determination whether a model for providing the requested custom analytics service is prepared is affirmative, to collect data required for the custom analytics service, to run the prepared model using the collected data, and to provide, to the service consumer, a custom analytics report representing a result of running the prepared model, the report including output information as specified in the information included in the request from the service consumer.

Aspect 5: The apparatus according to any of aspects 1 to 4, wherein the at least one memory and the instructions are further configured to, with the at least one processing circuitry, cause the apparatus at least:

to register or update profile information specifying the network data analytics entity having the analytics logical function in a network repository element or a network repository function, wherein the profile information comprises a list of available or collectable data and information indicating the ability to provide custom analytics services.

Aspect 6: An apparatus for use by a communication network element or communication network function configured to operate as a model training entity having a model training logical function, the apparatus comprising at least one processing circuitry, and at least one memory for storing instructions to be executed by the processing circuitry, wherein the at least one memory and the instructions are configured to, with the at least one processing circuitry, cause the apparatus at least:

to receive, from an analytic entity, a request to obtain a trained model capable of providing a custom analytics service, the request comprising information specifying the custom analytics service, to obtain, from data sources, information required to train a model for providing the requested custom analytics service, to determine a model being able to process the obtained information, to prepare data according to the information specifying the custom analytics service, to train the model using the prepared data, and to provide the trained model to the analytic entity.

Aspect 7: The apparatus according to aspect 6, wherein the information specifying the custom analytics service comprises at least one of:

an indication element for indicating that a custom analytics service is requested, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service.

Aspect 8: The apparatus according to aspect 6 or 7, wherein the data sources comprises at least one of a communication network element or communication network function, and an analytic data repository entity.

Aspect 9: The apparatus according to any of aspects 6 to 8, wherein the at least one memory and the instructions are further configured to, with the at least one processing circuitry, cause the apparatus at least:

to register or update profile information specifying the model training entity having the model training logical function in a network repository element or a network repository function, wherein the profile information comprises a list of available or collectable data and information indicating the ability to provide trained models for custom analytics services.

Aspect 10: The apparatus according to any of aspects 6 to 9, wherein the at least one memory and the instructions are further configured to, with the at least one processing circuitry, cause the apparatus at least:

to determine whether the trained model is allowed to be exposed to other service consumers, in case the determination is negative, to update profile information in a network repository element or a network repository function, wherein the profile information comprises a specification of the custom analytics service including a description of analytics and meta data, and an identification of the service consumer for which the custom analytics service is provided, and to inform the analytic entity to which the trained model is sent that the custom analytics service is to be provided only to specific consumers.

Aspect 11: The apparatus according to aspect 10, wherein the at least one memory and the instructions are further configured to, with the at least one processing circuitry, cause the apparatus at least:

in case the determination is affirmative, to update profile information in a network repository element or a network repository function, wherein the profile information comprises a specification of the custom analytics service including a description of analytics and meta data, without limiting the usage of the custom analytics service to specified consumers.

Aspect 12: An apparatus for use by a communication network element or communication network function configured to operate as a network repository entity, the apparatus comprising at least one processing circuitry, and at least one memory for storing instructions to be executed by the processing circuitry, wherein the at least one memory and the instructions are configured to, with the at least one processing circuitry, cause the apparatus at least:

to receive a discovery request, from a service consumer, indicating that a custom analytics service is requested, the request comprising information specifying at least one of input data and input data sources required for setting up the requested custom analytics service, to process the information comprised in the request, to return, to the service consumer, a list of network functions supporting custom analytics services and having access to required information for the requested custom analytics service.

Aspect 13: The apparatus according to aspect 12, wherein the at least one memory and the instructions are further configured to, with the at least one processing circuitry, cause the apparatus at least:

to check whether the service consumer is allowed to access to custom analytics service or to required information for the requested custom analytics service, wherein the list of network function is returned only in case the check is affirmative.

Aspect 14: The apparatus according to aspect 12 or 13, wherein the list of network functions further includes an indication of collectable data per network function instance and a list of available custom analytics.

Aspect 15: The apparatus according to any of aspects 12 to 14, wherein the at least one memory and the instructions are further configured to, with the at least one processing circuitry, cause the apparatus at least:

to receive a registration or update of profile information specifying a network entity having at least one of an analytics logical function and a model training logical function, wherein the profile information comprises a list of available or collectable data and information indicating the ability to provide custom analytics services or information indicating the ability to provide trained models for custom analytics services.

Aspect 16: An apparatus for use by a communication network element or communication network function configured to operate as a service consumer, the apparatus comprising at least one processing circuitry, and at least one memory for storing instructions to be executed by the processing circuitry, wherein the at least one memory and the instructions are configured to, with the at least one processing circuitry, cause the apparatus at least:

to send, to a network repository entity, a discovery request indicating that a custom analytics service is requested, the request comprising information specifying at least one of input data and input data sources required for setting up the requested custom analytics service, to receive, from the network repository entity, a list of network functions supporting custom analytics services and having access to required information for the requested custom analytics service, to check whether the received list comprises a custom analytics service satisfying the requirements of the requested custom analytics service and to contact a network function according to a result of the check.

Aspect 17: The apparatus according to aspect 16, wherein the list of network functions further includes an indication of collectable data per network function instance and a list of available custom analytics.

Aspect 18: The apparatus according to aspect 16 or 17, wherein the at least one memory and the instructions are further configured to, with the at least one processing circuitry, cause the apparatus at least:

in case the check results that the received list comprises a custom analytics service satisfying the requirements of the requested custom analytics service, to contact a network function providing the identified custom analytics service and to send information specifying the custom analytics service.

Aspect 19: The apparatus according to aspect 18, wherein the information specifying the custom analytics service comprises at least one of:

an indication element for indicating the identified custom analytics service, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service.

Aspect 20: The apparatus according to aspect 16 or 17, wherein the at least one memory and the instructions are further configured to, with the at least one processing circuitry, cause the apparatus at least:

in case the check results that the received list does not comprise a custom analytics service satisfying the requirements of the requested custom analytics service, to select, from the received list, a network function configured to operate as an analytics entity having an analytics logical function and input data from available or collectable data of the selected network function for building the requested custom analytics service, to contact the selected network function and to send a request for provision of a custom analytics service, the request comprising information specifying the custom analytics service.

Aspect 21: The apparatus according to aspect 20, wherein the information specifying the custom analytics service comprises at least one of:

an indication element for indicating that a custom analytics service is requested, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service.

Aspect 22: The apparatus according to any of aspects 16 to 21, wherein the at least one memory and the instructions are further configured to, with the at least one processing circuitry, cause the apparatus at least:

to receive, from the contacted network function, a custom analytics report, the report including output information as specified in the information included in the request to the network function.

Aspect 23: A method for use in a communication network element or communication network function configured to operate as an analytics entity and having an analytics logical function, the method comprising receiving a request, from a service consumer, for provision of a custom analytics service, the request comprising information specifying the custom analytics service, processing data retrieved from the request for determining whether a model for providing the requested custom analytics service is prepared, and in case the determination is negative, determining and selecting a model training entity having a model training logical function which is able to create a model for custom analytics and has access to data required for the requested custom analytics service, requesting, from the selected model training entity, to obtain a trained model capable of providing the requested custom analytics service and forwarding the information specifying the custom analytics service to the selected model training entity.

Aspect 24: The method according to aspect 23, wherein the information specifying the custom analytics service comprises at least one of:

an indication element for indicating that a custom analytics service is requested, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service.

Aspect 25: The method according to aspect 23 or 24, further comprising receiving, from the selected model training entity, a trained model, collecting data required for the custom analytics service, running the trained model using the collected data, and providing, to the service consumer, a custom analytics report representing a result of running the trained model, the report including output information as specified in the information included in the request from the service consumer.

Aspect 26: The method according to aspect 23 or 24, further comprising when the determination whether a model for providing the requested custom analytics service is prepared is affirmative, collecting data required for the custom analytics service, running the prepared model using the collected data, and providing, to the service consumer, a custom analytics report representing a result of running the prepared model, the report including output information as specified in the information included in the request from the service consumer.

Aspect 27: The method according to any of aspects 23 to 26, further comprising registering or updating profile information specifying the network data analytics entity having the analytics logical function in a network repository element or a network repository function, wherein the profile information comprises a list of available or collectable data and information indicating the ability to provide custom analytics services.

Aspect 28: A method for use in a communication network element or communication network function configured to operate as a model training entity having a model training logical function, the method comprising receiving, from an analytic entity, a request to obtain a trained model capable of providing a custom analytics service, the request comprising information specifying the custom analytics service, obtaining, from data sources, information required to train a model for providing the requested custom analytics service, determining a model being able to process the obtained information, preparing data according to the information specifying the custom analytics service, training the model using the prepared data, and providing the trained model to the analytic entity.

Aspect 29: The method according to aspect 28, wherein the information specifying the custom analytics service comprises at least one of:

an indication element for indicating that a custom analytics service is requested, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service.

Aspect 30: The method according to aspect 28 or 29, wherein the data sources comprises at least one of a communication network element or communication network function, and an analytic data repository entity.

Aspect 31: The method according to any of aspects 28 to 30, further comprising registering or updating profile information specifying the model training entity having the model training logical function in a network repository element or a network repository function, wherein the profile information comprises a list of available or collectable data and information indicating the ability to provide trained models for custom analytics services.

Aspect 32: The method according to any of aspects 28 to 31, further comprising determining whether the trained model is allowed to be exposed to other service consumers, in case the determination is negative, updating profile information in a network repository element or a network repository function, wherein the profile information comprises a specification of the custom analytics service including a description of analytics and meta data, and an identification of the service consumer for which the custom analytics service is provided, and informing the analytic entity to which the trained model is sent that the custom analytics service is to be provided only to specific consumers.

Aspect 33: The method according to aspect 32, further comprising in case the determination is affirmative, updating profile information in a network repository element or a network repository function, wherein the profile information comprises a specification of the custom analytics service including a description of analytics and meta data, without limiting the usage of the custom analytics service to specified consumers.

Aspect 34: A method for use in a communication network element or communication network function configured to operate as a network repository entity, the method comprising receiving a discovery request, from a service consumer, indicating that a custom analytics service is requested, the request comprising information specifying at least one of input data and input data sources required for setting up the requested custom analytics service, processing the information comprised in the request, returning, to the service consumer, a list of network functions supporting custom analytics services and having access to required information for the requested custom analytics service.

Aspect 35: The method according to aspect 34, further comprising checking whether the service consumer is allowed to access to custom analytics service or to required information for the requested custom analytics service, wherein the list of network function is returned only in case the check is affirmative.

Aspect 36: The method according to aspect 34 or 35, wherein the list of network functions further includes an indication of collectable data per network function instance and a list of available custom analytics.

Aspect 37: The method according to any of aspects 34 to 36, further comprising receiving a registration or update of profile information specifying a network entity having at least one of an analytics logical function and a model training logical function, wherein the profile information comprises a list of available or collectable data and information indicating the ability to provide custom analytics services or information indicating the ability to provide trained models for custom analytics services.

Aspect 38: A method for use in a communication network element or communication network function configured to operate as a service consumer, the method comprising sending, to a network repository entity, a discovery request indicating that a custom analytics service is requested, the request comprising information specifying at least one of input data and input data sources required for setting up the requested custom analytics service, receiving, from the network repository entity, a list of network functions supporting custom analytics services and having access to required information for the requested custom analytics service, checking whether the received list comprises a custom analytics service satisfying the requirements of the requested custom analytics service and contacting a network function according to a result of the check.

Aspect 39: The method according to aspect 38, wherein the list of network functions further includes an indication of collectable data per network function instance and a list of available custom analytics.

Aspect 40: The method according to aspect 38 or 39, further comprising in case the check results that the received list comprises a custom analytics service satisfying the requirements of the requested custom analytics service, contacting a network function providing the identified custom analytics service and sending information specifying the custom analytics service.

Aspect 41: The method according to aspect 40, wherein the information specifying the custom analytics service comprises at least one of:

an indication element for indicating the identified custom analytics service, information about input data related to the custom analytics service, information indicating output data expected from the custom analytics service, information indicating a type of analytic of the custom analytics service, information indicating a time period for the custom analytics service, information indicating a reporting interval for the custom analytics service, information indicating how to label data of the custom analytics service, and information indicating that spatial trends are to be captured by the custom analytics service.

Aspect 42: The method according to aspect 38 or 39, further comprising
in case the check results that the received list does not comprise a custom analytics service satisfying the requirements of the requested custom analytics service,
selecting, from the received list, a network function configured to operate as an analytics entity having an analytics logical function and input data from available or collectable data of the selected network function for building the requested custom analytics service,
contacting the selected network function and to send a request for provision of a custom analytics service, the request comprising information specifying the custom analytics service.

Aspect 43: The method according to aspect 42, wherein the information specifying the custom analytics service comprises at least one of:
an indication element for indicating that a custom analytics service is requested,
information about input data related to the custom analytics service,
information indicating output data expected from the custom analytics service,
information indicating a type of analytic of the custom analytics service,
information indicating a time period for the custom analytics service,
information indicating a reporting interval for the custom analytics service,
information indicating how to label data of the custom analytics service, and
information indicating that spatial trends are to be captured by the custom analytics service.

Aspect 44: The method according to any of aspects 38 to 43, further comprising
receiving, from the contacted network function, a custom analytics report, the report including output information as specified in the information included in the request to the network function.

Aspect 45. A computer program product for a computer, including software code portions for performing the steps of any of Aspects 23 to 27 or Aspects 28 to 33 or Aspects 34 to 37 or Aspects 38 to 44, when said product is run on the computer.

Aspect 46. The computer program product according to Aspect 45, wherein
the computer program product includes a computer-readable medium on which said software code portions are stored, and/or
the computer program product is directly loadable into the internal memory of the computer and/or transmittable via a network by means of at least one of upload, download and push procedures.

It should be appreciated that
an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.
embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.
implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).
embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described,
an apparatus may be implemented by a semiconductor chip, a chipset, or a (hardware) module including such chip or chipset;
embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.
embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:
1. An apparatus comprising
at least one processing circuitry, and
at least one memory for storing instructions which, when executed by the at least one processing circuitry,
cause the apparatus at least to perform:
receiving a request, from a service consumer, for provisioning a custom analytics service, the request comprising information specifying the custom analytics service including at least information indicating input data that needs to be collected, information regarding an expected output, information indicating a type of analytics including whether forecasting or classification is requested, information regarding a time granularity of the output data, information indicating whether a spatial trend is to be captured and information regarding labeling including a threshold utilized to label an anomaly level of data of the custom analytics service,
processing the information specifying the custom analytics service that is retrieved from the request for determining whether a model for providing the custom analytics service is available, determining that the model for providing the custom analytics service is not available; and in response to a determination that the custom analytics service is not available:

determining and selecting (i) a model training entity having a model training logical function which is able to create a model for custom analytics and has access to data required for the custom analytics service, and (ii) the input data from data available to or collectible by the model training entity to be used to build the custom analytics service, requesting, from the model training entity, a trained model for custom analytics capable of providing the custom analytics service, and forwarding the information specifying the custom analytics service to the model training entity.

2. The apparatus according to claim 1, wherein the information specifying the custom analytics service further comprises at least one of:

an indication for indicating that the custom analytics service is requested, information indicating a time period for the custom analytics service, or information indicating a reporting interval for the custom analytics service.

3. The apparatus according to claim 1, wherein the instructions, when executed by the at least one processing circuitry, further cause the apparatus at least to perform:

receiving, from the model training entity, the trained model for custom analytics, collecting the data required for the custom analytics service, running the trained model for custom analytics using the data required for the custom analytics service of the collecting, and providing, to the service consumer, a custom analytics report representing a result of the running the trained model for custom analytics, the custom analytics report including output information as specified in the information specifying the custom analytics service that is included in the request from the service consumer.

4. The apparatus according to claim 1, wherein the instructions, when executed by the at least one processing circuitry, further cause the apparatus at least to perform:

when a determination whether the model for providing the custom analytics service is available is affirmative, collecting the data required for the custom analytics service, running the model for providing the custom analytics using the data required for the custom analytics service of the collecting, and providing, to the service consumer, a custom analytics report representing a result of the running the model for providing the custom analytics service, the custom analytics report including output information as specified in the information specifying the custom analytics service included in the request from the service consumer.

5. The apparatus according to claim 1, wherein the instructions, when executed by the at least one processing circuitry, further cause the apparatus at least to perform:

registering or updating profile information specifying a network data analytics entity having an analytics logical function in a network repository element or a network repository function, wherein the profile information comprises a list of available or collectable data and information indicating an ability to provide custom analytics services.

6. An apparatus comprising:

at least one processing circuitry, and at least one memory for storing instructions which, when executed by the at least one processing circuitry, cause the apparatus at least to perform:

receiving, from an analytic entity, a request to obtain a trained model capable of providing a custom analytics service, the request comprising information specifying the custom analytics service including at least information indicating input data that needs to be collected, information regarding an expected output, information indicating a type of analytics including whether forecasting or classification is requested, information regarding a time granularity of the output data, information indicating whether a spatial trend is to be captured and information regarding labeling including a threshold utilized to label an anomaly level of data of the custom analytics service, obtaining, from data sources, information required to train a model for providing the analytics service, determining a model able to process the information required to train, preparing data according to the information specifying the custom analytics service, wherein the data according to the information specifying the custom analytics service includes the input data that is available or collectible and is used to build the custom analytics service, training the model using the data of the preparing, determining whether the trained model is allowed to be exposed to other service consumers aside from a service consumer associated with the request based on a type of data comprised by the input data and a type of network element associated with the request, and providing the model of the training to the analytic entity, wherein the model of the training comprises a trained model.

7. The apparatus according to claim 6, wherein the information specifying the custom analytics service further comprises at least one of:

an indication for indicating that the custom analytics service is requested, information indicating a time period for the custom analytics service, or information indicating a reporting interval for the custom analytics service.

8. The apparatus according to claim 6, wherein the data sources comprise at least one of:

a communication network element or communication network function, or an analytic data repository entity.

9. The apparatus according to claim 6, wherein the instructions, when executed by the at least one processing circuitry, further cause the apparatus at least to perform:

registering or updating profile information specifying a model training entity having a model training logical function in a network repository element or a network repository function, wherein the profile information comprises a list of available or collectable data and information indicating an ability to provide trained models for custom analytics services.

10. The apparatus according to claim 6, wherein the instructions, when executed by the at least one processing circuitry, further cause the apparatus at least to perform:

in case the determining whether the trained model is allowed to be exposed to the other service consumers is negative, updating profile information in a network repository element or a network repository function, wherein the profile information comprises a specification of the custom analytics service including a description of analytics data and meta data, and an identification of the service consumer for which the custom analytics service is provided, and providing an indication of whether the trained model is allowed to be exposed to other service consumers aside from the service consumer associated with the request to the analytic entity.

11. The apparatus according to claim 10, wherein the instructions, when executed by the at least one processing circuitry, further cause the apparatus at least to perform:

in case the determining whether the trained model is allowed to be exposed to the other service consumers is affirmative, updating the profile information in the network repository element or the network repository function, wherein the profile information comprises the specification of the custom analytics service including the description of the analytics data and the meta data, without limiting usage of the custom analytics service to specified consumers.

12. An apparatus comprising:
at least one processing circuitry, and
at least one memory for storing instructions which, when executed by the at least one processing circuitry,
cause the apparatus at least to perform:
sending, to a network repository entity, a discovery request indicating that a custom analytics service is requested, the discovery request comprising information specifying at least (i) information regarding labeling including a threshold utilized to label an anomaly level of data of the custom analytics service, (ii) one of input data or input data sources required for setting up the custom analytics service indicated by the discovery request, (iii) a time granularity of output data requested from the custom analytics service, (iv) information indicating output data expected from the custom analytics service, (v) information indicating a type of analytics including whether forecasting or classification is requested, and (vi) information indicating whether a spatial trend is to be captured,
receiving, from the network repository entity, a list of network functions supporting custom analytics services and having access to required information for the custom analytics service indicated by the discovery request,
checking whether the list comprises a network function supporting a custom analytics service satisfying requirements of the custom analytics service indicated by the discovery request, and
contacting the network function supporting the custom analytics service that is determined as a result of the checking to satisfy the requirements of the requested custom analytics service indicated by the discovery request.

13. The apparatus according to claim 12, wherein the list of network functions further includes an indication of collectable data per network function instance and a list of available custom analytics.

14. The apparatus according to claim 12, wherein the instructions, when executed by the at least one processing circuitry, further cause the apparatus at least to perform:

in case the checking results in a determination that the list comprises the network function supporting the custom analytics service satisfying the requirements of the custom analytics service indicated by the discovery request, contacting the network function supporting the custom analytics service and sending information specifying the custom analytics service indcted by the discovery request to the network function.

15. The apparatus according to claim 14, wherein the information specifying the custom analytics service indicated by the discovery request further comprises at least one of:
an indication for indicating the custom analytics service,
information indicating a time period for the custom analytics service, or
information indicating a reporting interval for the custom analytics service.

16. The apparatus according to claim 12, wherein the instructions, when executed by the at least one processing circuitry, further cause the apparatus at least to perform:

in case the checking results in a determination that the list does not comprise the network function supporting the custom analytics service satisfying the requirements of the custom analytics service indicated by the discovery request,
selecting, from the list, a network function configured to operate as an analytics entity having an analytics logical function and input data from available or collectable data of the network function configured to operate as the analytics entity for building the custom analytics service indicated by the discovery request, and
contacting the network function configured to operate as the analytics entity and sending a request for provision of the custom analytics service indicated by the discovery request, the request for provision comprising information specifying the custom analytics service indicated by the discovery request.

17. The apparatus according to claim 16, wherein the information specifying the custom analytics service indicated by the discovery request further comprises at least one of:
an indication for indicating that the custom analytics service is requested,
information indicating a time period for the custom analytics service, or
information indicating a reporting interval for the custom analytics service.

18. The apparatus according to claim 12, wherein the instructions, when executed by the at least one processing circuitry, further cause the apparatus at least to perform:
receiving, from the network function configured to operate as the analytics entity, a custom analytics report, the custom analytics report including output information as specified in the information included in the request for provision sent to the network function.

19. A method comprising:
receiving a request, from a service consumer, for provision of a custom analytics service, the request comprising information specifying the custom analytics service including at least information indicating input data that needs to be collected, information regarding an expected output, information indicating a type of analytics including whether forecasting or classification is requested, information regarding a time granularity of the output data, information indicating whether a spatial trend is to be captured and information regarding labeling including a threshold utilized to label an anomaly level of data of the custom analytics service, processing the information specifying the custom analytics service that is retrieved from the request for determining whether a model for providing the analytics service is available, determining that the model for providing the custom analytics service is not available; and in response to a determination that the custom analytics service is not available:
- determining and selecting (i) a model training entity having a model training logical function which is able to create a model for custom analytics and has access to data required for the custom analytics service, and (ii) the input data from data available to or collectible by the model training entity to be used to build the custom analytics service,
- requesting, from the model training entity, a trained model for custom analytics capable of providing the custom analytics service, and
- forwarding the information specifying the custom analytics service to the model training entity.

20. A method comprising:

sending, to a network repository entity, a discovery request indicating that a custom analytics service is requested, the discovery request comprising information specifying at least (i) information regarding labeling including a threshold utilized to label an anomaly level of data of the custom analytics service, (ii) input data or input data sources required for setting up the custom analytics service indicated by the discovery request, (iii) a time granularity of output data requested from the custom analytics service, (iv) information indicating output data expected from the custom analytics service, (v) information indicating a type of analytics including whether forecasting or classification is requested, and (vi) information indicating whether a spatial trend is to be captured, receiving, from the network repository entity, a list of network functions supporting custom analytics services and having access to the required information for the custom analytics service indicated by the discovery request, checking whether the list comprises a network function supporting a custom analytics service satisfying requirements of the custom analytics service indicated by the discovery request, and contacting the network function supporting the custom analytics service that is determined as a result of the checking to satisfy the requirements of the requested custom analytics services indicated by the discovery request.

21. The apparatus according to claim 1, wherein the apparatus is further caused to process data, in response to the information indicating that a spatial trend is to be captured, using a convolutional layer as a first layer of the trained model for the custom analytics without aggregating the data.

22. The method according to claim 19, further comprising processing data, in response to the information indicating that a spatial trend is to be captured, using a convolutional layer as a first layer of the trained model for the custom analytics without aggregating the data.

* * * * *